(12) United States Patent
Joseph

(10) Patent No.: US 6,592,786 B2
(45) Date of Patent: Jul. 15, 2003

(54) METHOD AND APPARATUS FOR LAY FLAT CONTROL IN AN EXTRUDED FILM PRODUCTION LINE

(76) Inventor: Daniel R. Joseph, 720 Johnson Bend Rd., Weatherford, TX (US) 76088

( * ) Notice: Subject to any disclaimer, the term of this patent is extended or adjusted under 35 U.S.C. 154(b) by 373 days.

(21) Appl. No.: 09/761,035

(22) Filed: Jan. 16, 2001

(65) Prior Publication Data

US 2001/0023998 A1 Sep. 27, 2001

Related U.S. Application Data

(60) Provisional application No. 60/176,457, filed on Jan. 15, 2000.

(51) Int. Cl.⁷ ............................................. B29C 47/92
(52) U.S. Cl. .................. 264/40.1; 264/40.3; 264/40.6; 264/40.7; 264/564; 264/566; 264/407; 425/72.1; 425/140; 425/143; 425/145; 425/174.2; 425/326.1
(58) Field of Search ............................... 425/72.1, 140, 425/141, 143, 145, 174.2, 326.1; 264/40.1, 40.3, 40.6, 40.7, 407, 564, 566

(56) References Cited

U.S. PATENT DOCUMENTS

| | | | | |
|---|---|---|---|---|
| 4,140,460 A | * | 2/1979 | Carlsen | 425/140 |
| 4,246,212 A | * | 1/1981 | Upmeier et al. | 264/40.1 |
| 5,104,593 A | * | 4/1992 | Joseph | 264/40.1 |
| 5,352,393 A | * | 10/1994 | Joseph | 425/140 |
| 5,468,134 A | * | 11/1995 | Cree | 425/72.1 |
| 5,525,277 A | * | 6/1996 | Joseph | 264/40.6 |
| 5,676,893 A | * | 10/1997 | Cree | 264/40.1 |
| 5,891,383 A | * | 4/1999 | Joseph | 264/40.3 |
| 6,293,778 B1 | * | 9/2001 | Joseph | 425/72.1 |

\* cited by examiner

Primary Examiner—James P. Mackey
Assistant Examiner—Joseph Leyson
(74) Attorney, Agent, or Firm—Melvin A. Hunn

(57) ABSTRACT

An apparatus for producing an extruded film tube and supplying said tube to a collapsing and roller assembly includes a die for extruding a molten material in the form of a tube which is in a molten state below a frost line and in a solid state above the frost line. A blower system supplies and exhausts cooling air to and from an interior portion of the tube, and is regulated by a valve. At least two sensors are provided, one below the frost line for sensing the position of said tube, and one located proximate the tube in a position above said frost line. The upper sensor is used for sensing the position of the tube prior to collapsing and flattening it. A controller receives feedback signals from both sensors and controls operation of the valve.

21 Claims, 19 Drawing Sheets

METHOD AND APPARATUS FOR LAY FLAT CONTROL IN AN EXTRUDED FILM PRODUCTION LINE

PROVISIONAL PRIORITY CLAIM

This application claims the benefit of U.S. Provisional Patent Application Ser. No. 60/176,457, filed Jan. 15, 2000, entitled "Method and Apparatus for Lay Flat Control in an Extruded Film Production," naming as sole inventor Daniel R. Joseph. This provisional application is incorporated herein as if fully set forth.

FIELD OF THE INVENTION

The present invention relates in general to an extruded film processing system, and in particular to control systems utilized in extruded film processing systems.

DESCRIPTION OF THE PRIOR ART

Blown film extrusion lines are used to manufacture plastic bags and plastic sheets. A molten tube of plastic is extruded from an annular die, and then stretched and expanded to a larger diameter and a reduced radial thickness by the action of overhead nip rollers and internal air pressure. Typically, ambient air is entrained by one or more blowers. The ambient air provides a cooling medium, which absorbs heat from the molten material. This speeds up the change in state from a molten material back to a solid material.

Additionally, the ambient air entrained by the blowers is used to provide air pressure, which is utilized to control the size and thickness of the film tube. One type of blown film extrusion line utilizes air flow on the exterior surface of the film tube in order to absorb heat. A different, and more modern, type of blown film extrusion line utilizes both an external flow of cooling air and an internal flow of cooling air in order to cool and size the film tube. Whether the blown film tube is cooled from the interior surface, the exterior surface, or some combination of the two, one common problem in blown film extrusion lines is that of obtaining precise control over the diameter of the extruded film tube. Tight control over the diameter ensures uniform product dimensions, which includes the size of the extruded product, as well as the thickness of the plastic material.

Acoustic sensors may be utilized to gauge the diameter of the product. When such acoustic sensors are utilized, a feedback loop is established to alter dynamically one or more controllable variable of the process, such as blower speed, and/or temperature control over the cooling air stream.

SUMMARY OF THE INVENTION

It is one objective of the present invention to provide a substantially improved ability to keep blown film product width within established specifications. This invention provides improved lay-flat control by adding a second feedback control loop, in addition to, and or supplementation of, the primary control feedback loop which is utilized to control the extrusion and cooling process.

This additional and/or supplemental control loop of the present invention measures actual bubble diameter, preferably (but not necessarily) utilizing acoustic sensors, and feeds back this information to one or more controllers. Preferably the controller is the one which is utilized to perform the calculations and control operations of the primary control loop for expanding and cooling the extruded film tube. The sensed diameter data is compared against an operator established set point. In the preferred embodiment, the resulting error is injected into the Internal Bubble Cooling system (the "IBC") to provide a correction effect. In the preferred embodiment, this is in fact directly added as an input to the primary control loop.

Preferably one or more non-contact acoustic sensors are located above the so-called "frost line", thus providing a measure of the diameter of the product after cooling but preferably BEFORE flattening of the extruded film tube by an assembly of collapsing boards and nip rollers. In most conventional blown film lines, this assembly is located overhead of the die and related components. Thus the diameter sensors of the present invention are located above the sensors of the primary control loop for controlling product diameter (through control of the expansion and cooling of the extruded film tube) but beneath the collapsing boards and nip rollers. This preferred placement of the second set of bubble diameter measuring devices of the present invention above the IBC sensors provides a quicker response than established methods in the prior art. A variety of alternative sensors may be utilized in lieu of an acoustic sensor. For example, mechanical feeler arms may be utilized, especially if the sensor is located sufficiently far from the frost line to minimize the chance of creating deformations in the product through contact with the mechanical feeler arms. As a particular matter, an acoustic sensor works fine since it has no moving parts and creates no pressure on the tube or bubble. It may however be difficult (but not impossible) to use optical sensor since the sensor response would be dependent on the color of the extruded tube. Accordingly, the preferred sensor is any non-optical sensor.

The prior art approach is characterized by the utilization of a lay-flat measuring bar after the primary nip rollers. In the prior art systems, the distance between the IBC sensors (of the primary control loop) and the lay-flat bar can be nearly 40 feet and when oscillating nip devices are used; of course, this path length of the prior art approach can vary as the nip oscillates.

One additional problem of the prior art is resolved by the present invention. IBC performance depends on stable airflow sources to maintain a stable bubble. Therefore, disturbances can result in changes in the final product width. In particular, rotating or oscillating dies use moving air chambers that can induce a disturbance in the airflow as a result of uneven airflow in the chamber. In the present invention, the variation in product diameter resulting from the airflow changes that occur because of imbalances in the rotating chamber can be significantly reduced.

In accordance with the preferred embodiment of the present invention, one or more sensors are positioned in a different horizontal plane from the IBC control sensors. Preferably, these sensors are also placed in a different circumferential position than the primary control loop sensors. In this patent, these sensors are called "lay-flat" sensors to distinguish them from the IBC sensors. In the preferred embodiment, the placing the lay-flat sensors in a horizontal plane vertically above the IBC sensors provides optimum results. The purpose of these sensors is to provide a measurement of the actual bubble diameter from which the final lay-flat dimension can be calculated from a simple formula (lay-flat equals pi multiplied by the sensed diameter divided by two).

The preferred system of the present invention monitors the sensor(s) for proper operation and selects which particular sensors are allowed to contribute to the bubble diameter measurement. It also provides an indicator when all sensors are not allowed to contribute. The system filters the received signal from one or more sensors and calculates the expected lay-flat.

This system can also accept a calibration input from the operator. This calibration input allows the operator to indicate the current actual lay-flat as measured at the point of accumulation (such as a spooling system) for the material. The system takes this reading and back calculates an adjustment factor that accounts for the "draw down" of the material.

Draw down is the amount the material shrinks in width as a result of the tension placed on the material during accumulation. The amount of draw down is dependent upon both the material utilized in the extrusion line and the amount of tension utilized in the accumulation operations. Thus the amount of "draw down" is a function of both material and tension. The mixture and composition of the material input into the blown film line is relatively fixed for each product run; however, the material can vary greatly in composition (and associated physical properties) between product runs. The amount of tension applied to the accumulation or spooling system also varies between production lines and production runs; however, the amount of tension applied is susceptible to a greater amount or range of operator (and computer-system) control.

Accordingly the lay-flat feature of the present invention is useful over a wide variety of materials, which are used in blown film line, and it is also useful over a wide range of production equipment.

In accordance with the preferred embodiment of the present invention, the system converts the actual lay-flat signal into a signal that matches the signal type used by the IBC sensor; in other words, the lay-flat signal can be translated to the units and scale utilized by the primary control loop. The system directly accepts as an input the converted lay-flat signal and compares it to the operator-established set point.

The system also monitors the signal rate of change and position against operator set windows of operation. This system essentially decides if the lay-flat signal is stable and within acceptable range for proper corrective action. If the signal is acceptable, the system applies an adjustable gain, inverts the signal and injects the signal into the IBC control system.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

DETAILED DESCRIPTION OF THE INVENTION

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

Figure 1:
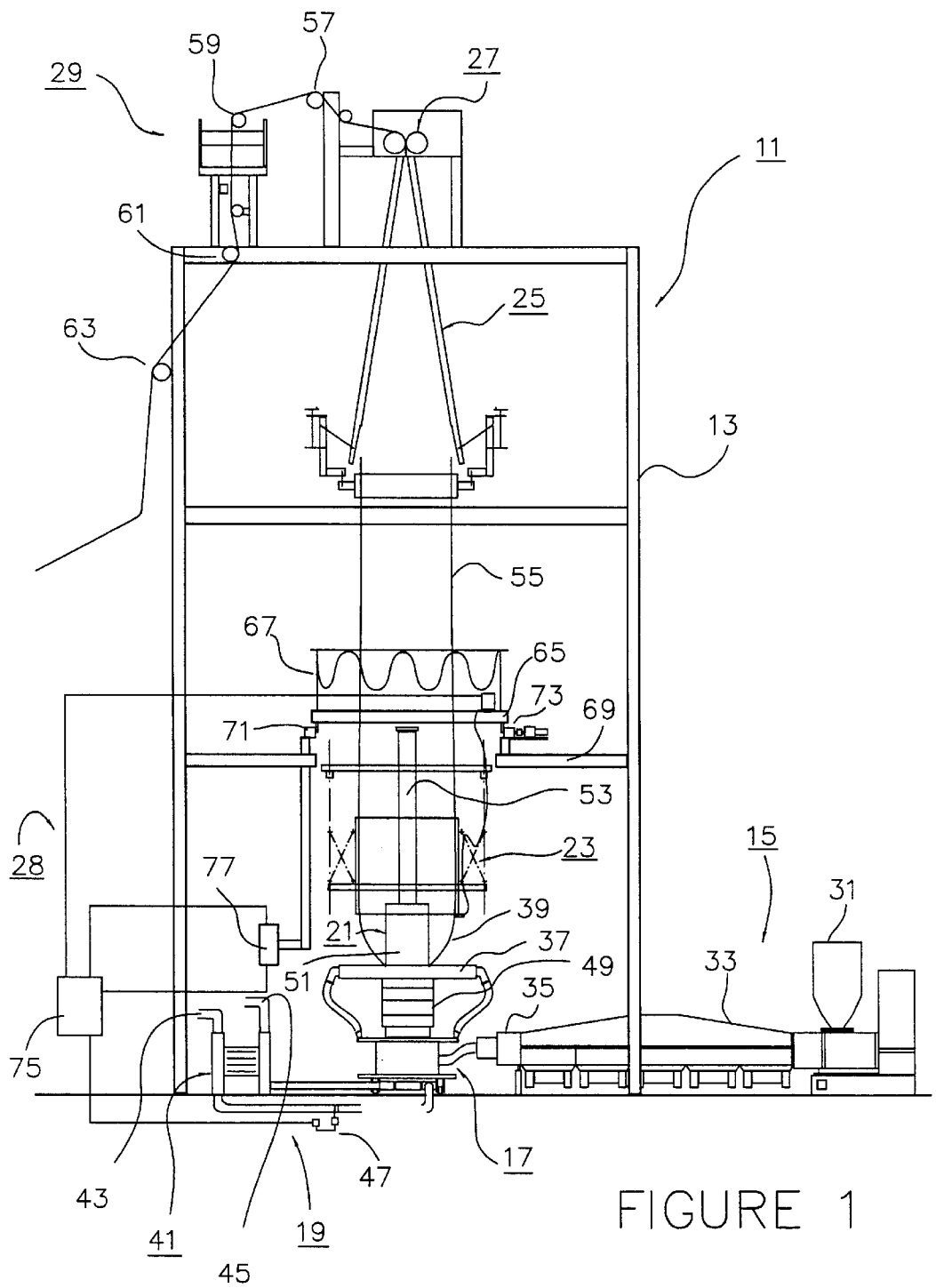
FIG. 1 is a view of a blown film extrusion line equipped with the improved control system of the present invention.

FIG. 1 is a view of blown film extrusion line 11, which includes a number of subassemblies which cooperate to produce plastic bags and the like from plastic resin. The main components include blown film tower 13, which provides a rigid structure for mounting and aligning the various subassemblies, extruder subassembly 15, die subassembly 17, blower subassembly 19, stack 21, sizing cage 23, collapsible frame 25, nips 27, control subassembly 28 and rollers 29.

Plastic granules are fed into hopper 31 of extruder subassembly 15. The plastic granules are melted and fed by extruder 33 and pushed into die subassembly 17, and specifically to annular die 37. The molten plastic granules emerge from annular die 37 as a molten plastic tube 39, which expands from the die diameter to a desired final diameter, which may vary typically between two to three times the die diameter.

Blower subassembly 19 includes a variety of components which cooperate together to provide a flow of cooling air to the interior of molten plastic tube 39, and also along the outer periphery of molten plastic tube 39. Blower subassembly includes blower 41 which pulls air into the system at intake 43, and exhausts air from the system at exhaust 45. The flow of air into molten plastic tube 39 is controlled at valve 47. Air is also directed along the exterior of molten plastic tube from external air ring 49, which is concentric to annular die 37. Air is supplied to the interior of molten plastic tube 39 through internal air diffuser 51. Air is pulled from the interior of molten plastic tube 39 by exhaust stack 53.

The streams of external and internal cooling airs serve to harden molten plastic tube 39 a short distance from annular die 37. The line of demarcation between the molten plastic tube 39 and the hardened plastic tube 55 is identified in the trade as the "frost line." Normally, the frost line is substantially at or about the location at which the molten plastic tube 39 is expanded to the desired final diameter.

Adjustable sizing cage 23 is provided directly above annular die 38 and serves to protect and guide the plastic tube 55 as it is drawn upward through collapsible frame 25 by nips 27. Afterwards, plastic tube 55 is directed through a series of rollers 57, 59, 61, and 63 which serve to guide the tube to packaging or other processing equipment.

In some systems, rotating frame 65 is provided for rotating relative to blown film tower 13. It is particularly useful in rotating mechanical feeler arms of the prior art systems around plastic tube 55 to distribute the deformations. Umbilical cord 67 is provided to allow electrical conductors to be routed to rotating frame 65. Rotating frame 65 rotates at bearings 71, 73 relative to stationary frame 69.

Control subassembly 28 is provided to monitor and control the extrusion process, and in particular the circumference of plastic tube 55. Control subassembly 28 includes supervisory control unit, and operator control panel 77.

Figure 2:
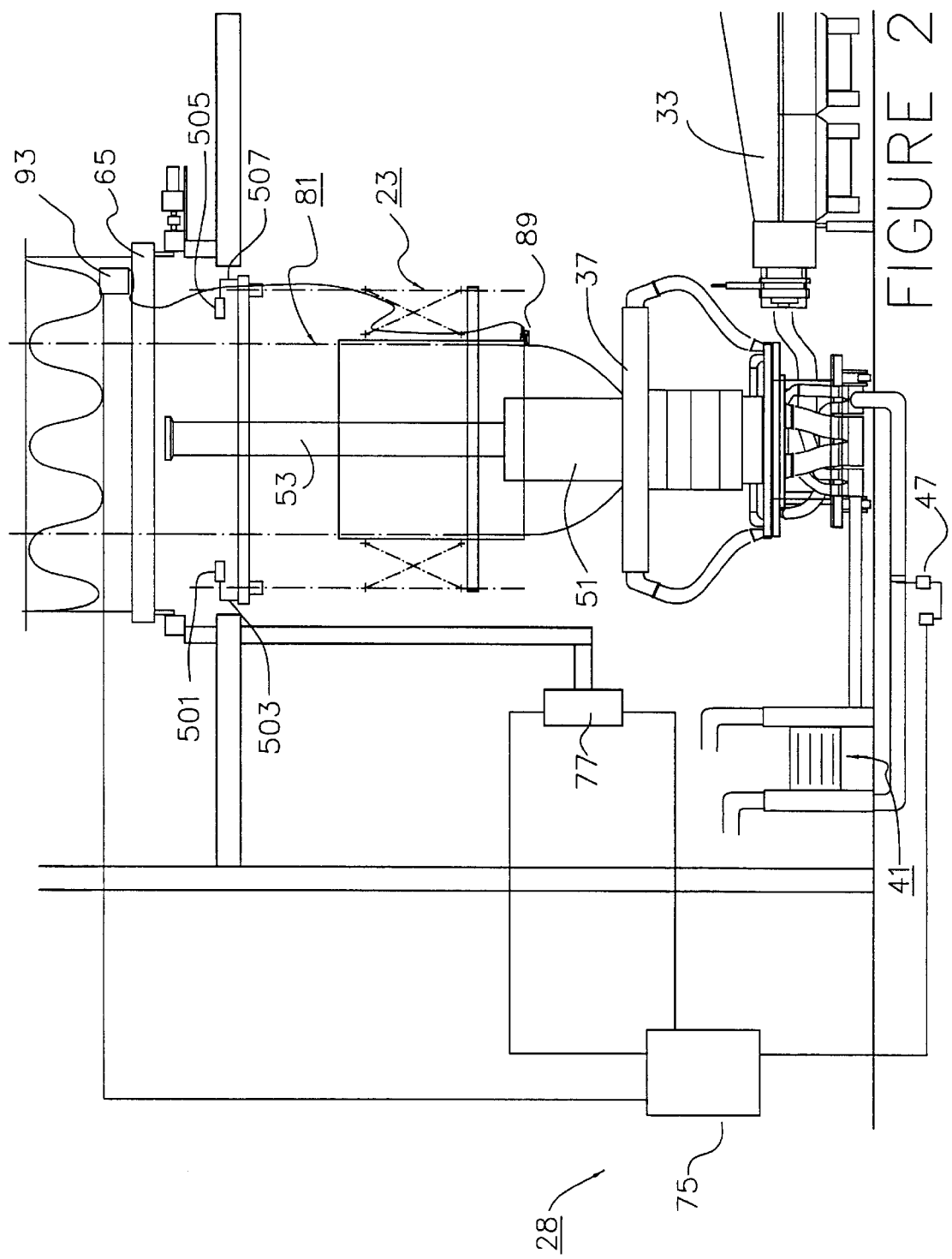
FIG. 2 is a view of the die, sizing cage, control subassembly and rotating frame of the blown film tower of FIG. 1.

FIG. 2 is a more detailed view of annular die 37, sizing cage 23, control subassembly 28, and rotating frame 65. As shown in FIG. 2, supervisory control unit 75 is electrically coupled to operator control panel 77, valve 47, and acoustic transducer 79. These components cooperate to define the primary control loop for controlling the volume of air contained within extruded film tube 81, and hence the thickness and diameter of the extruded film tube 81. Valve 47 controls the amount of air directed by blower 41 into extruded film tube 81 through internal air diffuser 51.

If more air is directed into extruded film tube 81 by internal air diffuser 51 than is exhausted from extruded film tube 81 by exhaust stack 43, the circumference of extruded film tube 81 will be increased. Conversely, if more air is exhausted from the interior of extruded film tube 81 by exhaust stack 53 than is inputted into extruded film tube 81 by internal air diffuser 51, the circumference of extruded film tube 81 will decrease.

In the preferred embodiment, flow control valve 47 is responsive to supervisory control unit 75 for increasing or decreasing the flow of air into extruded film tube 81. Operator control panel 77 serves to allow the operator to select the diameter of extruded film tube 81. Acoustic transducer 79 serves to generate a signal corresponding to the circumference of extruded film tube 81, and direct this signal to supervisory control unit 75 for comparison to the circumference setting selected by the operator at operator control panel 77. This defines the primary control loop.

If the actual circumference of extruded film tube 81 exceeds the selected circumference, supervisory control unit 75 operates flow control valve 47 to restrict the passage of air from blower 41 into extruded film tube 81. This results in a decrease in circumference of extruded film tube 81. Conversely, if the circumference of extruded film tube 81 is less than the selected circumference, supervisory control unit 75 operates on flow control valve 47 to increase the flow of air into extruded film tube 81 and increase its circumference. Of course, extruded film tube 81 will fluctuate in circumference, requiring constant adjustment and readjustment of the inflow of air by operation of supervisory control unit 75 and flow control valve 47.

The view of FIG. 2 also depicts the secondary lay-flat control loop of the present invention which provides an additional and supplemental control loop which provides information about the diameter of the extruded film tube as taken from a different portion of the extruded film tube which is preferably above the frost line and which accordingly provides a different reading of the product diameter.

As is depicted in the view of FIG. 2, in the preferred embodiment, a plurality of non-contact sensors 501, 505, (preferably but not necessarily acoustic sensors) are positioned adjacent the extruded film tube vertically above the sensors of the primary control loop, in a different and higher horizontal plane. While optical and other non-contact sensors could be utilized, acoustic sensors are preferred.

In this position, the second control loop provides information about the diameter of the product in the region between the primary IBC control sensors and the collapsing frame 25 and roller nips 27. The preferred location of the lay-flat sensors is several feet above the IBC sensor, such as four to six feet above the IBC sensor. In comparison to the systems of the prior art, this is advantageous since the prior art systems measure the diameter thirty (30) to forty (40) feet away. The effective "time lag" associated with the present invention is negligible, especially considering that production line speeds can range from 20 feet per minute to 500 feet per minute. The "response time" associated with the present invention is essentially zero as compared to the prior art systems, even at low production line speeds.

Preferably, the lay-flat sensors are secured through support assemblies 503, 507 to a non-moving portion of the blown film tower 13, as opposed to the sizing cage 23 which moves relative to the tower 13. In the preferred embodiment the lay-flat sensors are secured in a manner which allows they to be moved inward and/or outward relative to the tower 13 to place the sensors in sensing range of the expected bubble diameter for the particular production run.

While the depiction of FIG. 2 shows the lay-flat sensors in the same circumferential position as IBC sensor 89, but this is merely to ease the depiction of the entire system; preferably, the lay-flat sensors are located in a circumferential position other than in alignment with the IBC sensor, such as 90 degrees or 180 degrees shifted from the circumferential position of the IBC sensor.

It is one objective of the present invention to provide a substantially improved ability to keep blown film product width within established specifications. This invention provides improved lay-flat control by adding a second feedback control loop, in addition to, and or supplementation of, the primary control feedback loop which is utilized to control the extrusion and cooling process.

This additional and/or supplemental control loop of the present invention measures actual bubble diameter, preferably (but not necessarily) utilizing acoustic sensors, and feeds back this information to one or more controllers. Preferably the controller is the one which is utilized to perform the calculations and control operations of the primary control loop for expanding and cooling the extruded film tube. The sensed diameter data is compared against an operator established set point. In the preferred embodiment, the resulting error is injected into the Internal Bubble Cooling system (the "IBC") to provide a correction effect. In the preferred embodiment, this is in fact directly added as an input to the primary control loop.

Preferably one or more non-contact acoustic sensors are located above the so-called "frost line", thus providing a measure of the diameter of the product after cooling but preferably BEFORE flattening of the extruded film tube by an assembly of collapsing boards and nip rollers. In most conventional blown film lines, this assembly is located overhead of the die and related components. Thus the diameter sensors of the present invention are located above the sensors of the primary control loop for controlling product diameter (through control of the expansion and cooling of the extruded film tube) but beneath the collapsing boards and nip rollers. This preferred placement of the second set of bubble diameter measuring devices of the present invention above the IBC sensors provides a quicker response than established methods in the prior art. A variety of alternative sensors may be utilized in lieu of an acoustic sensor. For example, mechanical feeler arms may be utilized, especially if the sensor is located sufficiently far from the frost line to minimize the chance of creating deformations in the product through contact with the mechanical feeler arms. As a particular matter, an acoustic sensor works fine since it has no moving parts and creates no pressure on the tube or bubble. It may however be difficult (but not impossible) to use optical sensor since the sensor response would be dependent on the color of the extruded tube. Accordingly, the preferred sensor is any non-optical sensor.

The prior art approach is characterized by the utilization of a lay-flat measuring bar after the primary nip rollers. In the prior art systems, the distance between the IBC sensors (of the primary control loop) and the lay-flat bar can be nearly 40 feet and when oscillating nip devices are used; of course, this path length of the prior art approach can vary as the nip oscillates.

One additional problem of the prior art is resolved by the present invention. IBC performance depends on stable airflow sources to maintain a stable bubble. Therefore, disturbances can result in changes in the final product width. In particular, rotating or oscillating dies use moving air chambers that can induce a disturbance in the airflow as a result of uneven airflow in the chamber. In the present invention, the variation in product diameter resulting from the airflow changes that occur because of imbalances in the rotating chamber can be significantly reduced.

In accordance with the preferred embodiment of the present invention, one or more sensors are positioned in a different horizontal plane from the IBC control sensors. Preferably, these sensors are also placed in a different circumferential position than the primary control loop sensors. In this patent, these sensors are called "lay-flat" sensors to distinguish them from the IBC sensors. In the preferred embodiment, the placing the lay-flat sensors in a horizontal plane vertically above the IBC sensors provides optimum results. The purpose of these sensors is to provide a measurement of the actual bubble diameter from which the final lay-flat dimension can be calculated from a simple formula (lay-flat equals pi multiplied by the sensed diameter divided by two).

The preferred system of the present invention monitors the sensor(s) for proper operation and selects which particular sensors are allowed to contribute to the bubble diameter measurement. It also provides an indicator when all sensors are not allowed to contribute. The system filters the received signal from one or more sensors and calculates the expected lay-flat.

This system can also accept a calibration input from the operator. This calibration input allows the operator to indicate the current actual lay-flat as measured at the point of accumulation (such as a spooling system) for the material. The system takes this reading and back calculates an adjustment factor that accounts for the "draw down" of the material.

Draw down is the amount the material shrinks in width as a result of the tension placed on the material during accumulation. The amount of draw down is dependent upon both the material utilized in the extrusion line and the amount of tension utilized in the accumulation operations. Thus the amount of "draw down" is a function of both material and tension. The mixture and composition of the material input into the blown film line is relatively fixed for each product run; however, the material can vary greatly in composition (and associated physical properties) between product runs. The amount of tension applied to the accumulation or spooling system also varies between production lines and production runs; however, the amount of tension applied is susceptible to a greater amount or range of operator (and computer-system) control.

Accordingly the lay-flat feature of the present invention is useful over a wide variety of materials, which are used in blown film line, and it is also useful over a wide range of production equipment.

In accordance with the preferred embodiment of the present invention, the system converts the actual lay-flat signal into a signal that matches the signal type used by the IBC sensor; in other words, the lay-flat signal can be translated to the units and scale utilized by the primary control loop. The system directly accepts as an input the converted lay-flat signal and compares it to the operator-established set point.

The system also monitors the signal rate of change and position against operator set windows of operation. This system essentially decides if the lay-flat signal is stable and within acceptable range for proper corrective action. If the signal is acceptable, the system applies an adjustable gain, inverts the signal and injects the signal into the IBC control system.

Figure 3:
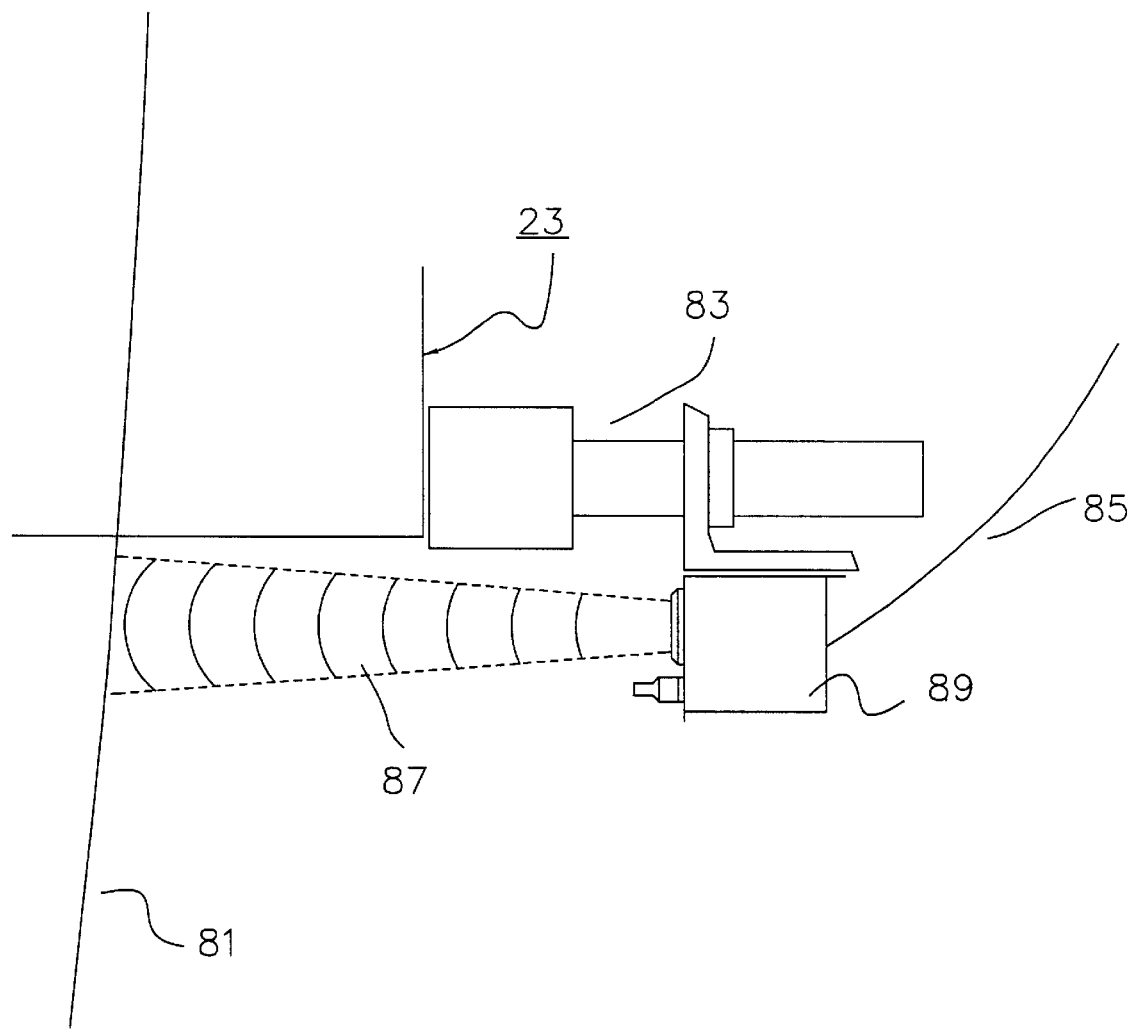
FIG. 3 is a view of the acoustic transducer of the improved control system of the present invention coupled to the sizing cage of the blown film extrusion line tower adjacent the extruded film tube of FIGS. 1 and 2.

FIG. 3 is a view of ultrasonic IBC sensor 89 of the improve control system of the present invention coupled to sizing cage 23 adjacent extruded film tube 81. In the preferred embodiment, acoustic transducer 79 comprises an ultrasonic measuring and control system manufactured by Massa Products Corporation of Hingham, Mass., Model Nos. E-369 and M5000, including a Massa Products ultrasonic sensor 89. It is an ultrasonic ranging and detection device which utilizes high frequency sound waves which are deflected off objects and detected. In the preferred embodiment, a pair of ultrasonic sensors 89 are used, one to transmit sonic pulses, and another to receive sonic pulses. For purposes of simplifying the description only one ultrasonic sensor 89 is shown, and in fact a single ultrasonic sensor can be used, first to transmit a sonic pulse and then to receive the return in an alternating fashion. The elapsed time between an ultrasonic pulse being transmitted and a significant echo being received corresponds to the distance between ultrasonic sensor 89 and the object being sensed. Of course, the distance between the ultrasonic sensor 89 and extruded film tube 81 corresponds to the circumference of extruded film tube 81. In the present situation, ultrasonic sensor 89 emits an interrogating ultrasonic beam 87 substantially normal to extruded film tube 81 and which is deflected from the outer surface of extruded film tube 81 and sensed by ultrasonic sensor 89.

The M5000 sensor is actually a sensor with all the functions of the M4000, M450 and M410 combined. This means that the transmit, receive and temperature compensation functions are all in a single 25×100 mm unit. It also includes a programmable on-board microprocessor that allows us to shift some of the signal filtering functions to the sensor. This is very helpful as it allows us to free up the main controller for higher-level tasks.

Similar acoustic or ultrasonic sensors can be utilized for the lay-flat sensors 501,505.

The Massa Products Corporation ultrasonic measurement and control system includes system electronics which utilize the duration of time between transmission and reception to produce a useable electrical output such as a voltage or current. In the preferred embodiment, ultrasonic sensor 89 is coupled to sizing cage 23 at adjustable coupling 83. In the preferred embodiment, ultrasonic sensor 89 is positioned within seven inches of extruded film tube 81 to minimize the impact of ambient noise on a control system. Ultrasonic sensor 89 is positioned so that interrogating ultrasonic beam 87 travels through a path which is substantially normal to the outer surface of extruded film tube 81, to maximize the return signal to ultrasonic sensor 89.

Figure 4:
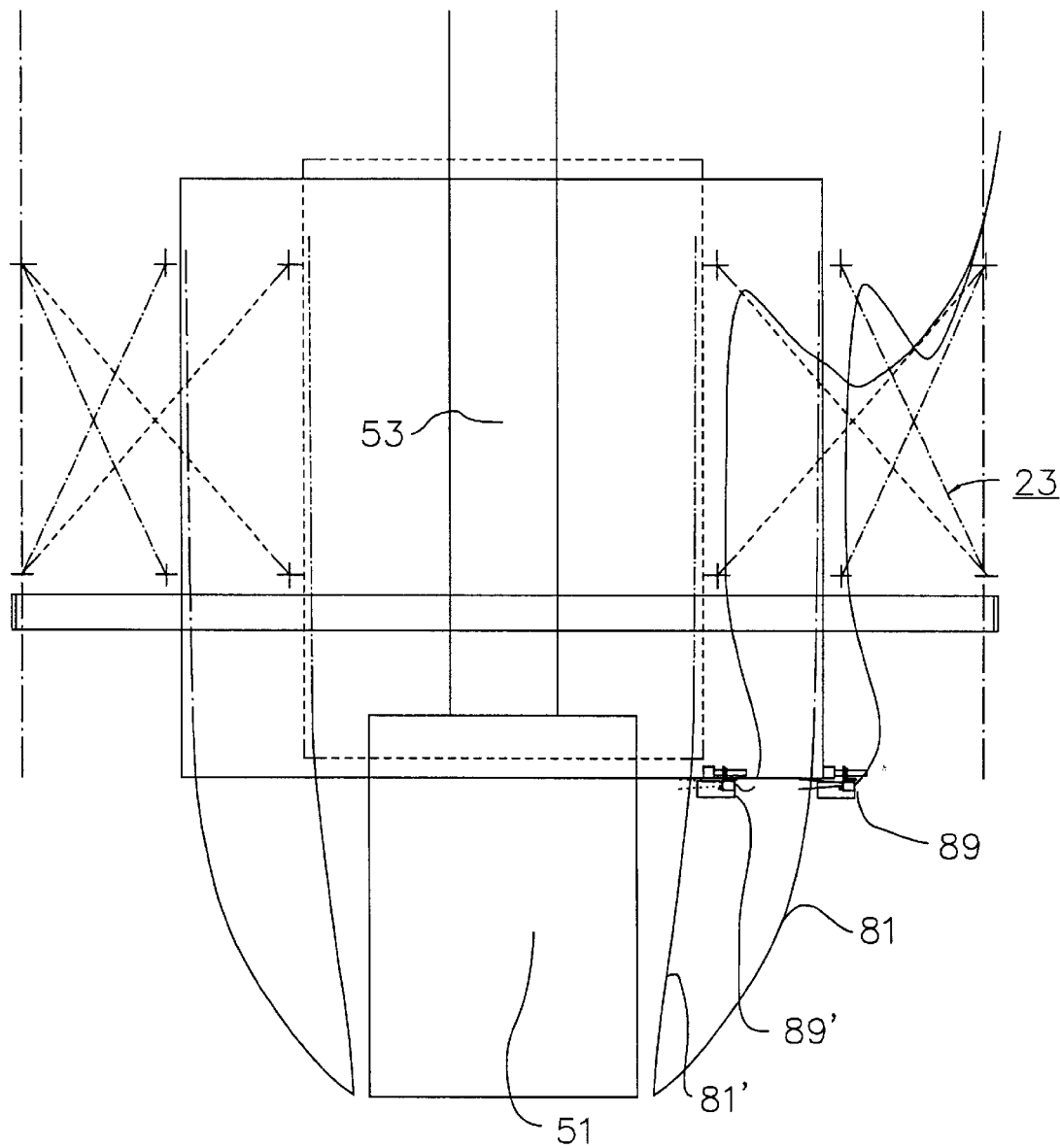
FIG. 4 is a view of the acoustic transducer of FIG. 3 coupled to the sizing cage of the blown film tower, in two positions, one position being shown in phantom.

FIG. 4 is a view of ultrasonic sensor 89 of FIG. 3 coupled to sizing cage 23 of the blown film tower 13, in two positions, one position being shown in phantom. In the first position, ultrasonic sensor 89 is shown adjacent extruded film tube 81 of a selected circumference. When extruded film tube 81 is downsized to a tube having a smaller circumference, ultrasonic sensor 89 will move inward and outward relative to the central axis of the adjustable sizing cage, along with the adjustable sizing cage 23. The second position is shown in phantom with ultrasonic sensor 89' shown adjacent extruded film tube 81' of a smaller circumference. For purposes of reference, internal air diffuser 51 and exhaust stack 53 are shown in FIG. 4. The sizing cage is also movable upward and downward, so ultrasonic sensor 89 is also movable upward and downward relative to the frost line of the extruded film tube 81.

Figure 5A:
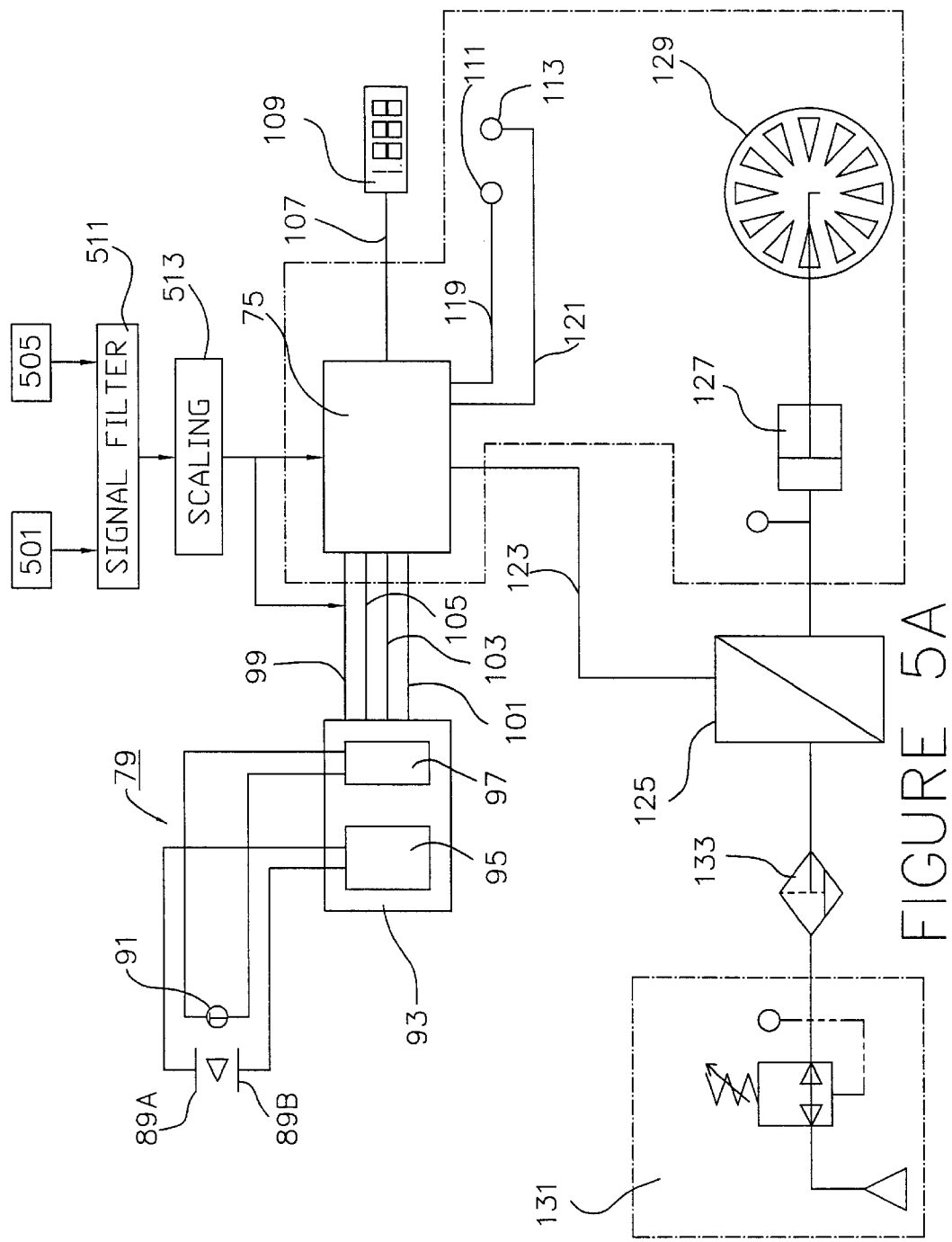
FIG. 5A is a schematic and block diagram view of the preferred control system of the present invention.

FIG. 5A is a schematic and block diagram view of the preferred control system of the present invention. The preferred acoustic transducer 79 of the present invention includes IBC ultrasonic sensor 89 and temperature sensor 91 which cooperate to produce a current position signal which is independent of the ambient temperature. IBC ultrasonic sensor 89 is electrically coupled to ultrasonic electronics module 95, and temperature sensor 91 is electrically coupled to temperature electronics module 97. Together, ultrasonic electronics module 95 and temperature electronics module 97 comprise transducer electronics 93. Four signals are produced by acoustic transducer 79, including one analog signal, and three digital signals.

As shown in FIG. 5A, four conductors couple transducer electronics to supervisory control unit 75. Specifically, conductor 99 routes a 0 to 10 volts DC analog input to supervisory control unit 75. Conductors 101, 103, and 105 provide digital signals to supervisory control unit 75 which correspond to a target present signal, maximum override, and minimum override. These signals will be described below in greater detail.

Supervisory control unit 75 is electrically coupled to set point display 109 through analog display output 107. An analog signal between 0 and 10 volts DC is provided to set point display 109 which displays the selected distance between ultrasonic sensor 89 and extruded film tube 81. A distance is selected by the operator through distance selector 111. Target indicator 113, preferably a light, is provided to indicate that the target (extruded film tube 81) is in range. Distance selector 111 is electrically coupled to supervisory control unit 75 by distance setting conductor 119. Target indicator 113 is electrically coupled to supervisory control unit 75 through target present conductor 121.

Supervisory control unit 75 is also coupled via valve control conductor 123 to proportional valve 125. In the preferred embodiment, proportional valve 125 corresponds to valve 47 of FIG. 1, and is a pressure control component manufactured by Proportionair of McCordsville, Ind., Model No. BBH. Proportional valve 125 translates an analog DC voltage provided by supervisory control unit 75 into a corresponding pressure between 0.5 and 1.2 bar. Proportional valve 125 acts on rotary valve 129 through cylinder 127. Pressurized air is provided to proportional valve 125 from pressurized air supply 131 through 20 micron filter 133.

Also, as depicted in FIG. 5A, the lay-flat sensors dynamically provide unprocessed diameter measurements during blown film production operations to supervisory control unit 75, after signal filtering is performed upon the raw measurements by signal filtering module 511, and scaling is performed by scaling module 513. The processed measurement data is provided as an input to supervisory control unit 75 directly via an input pin, or it is summed with the scaled diameter data on line 99.

Figure 5B:
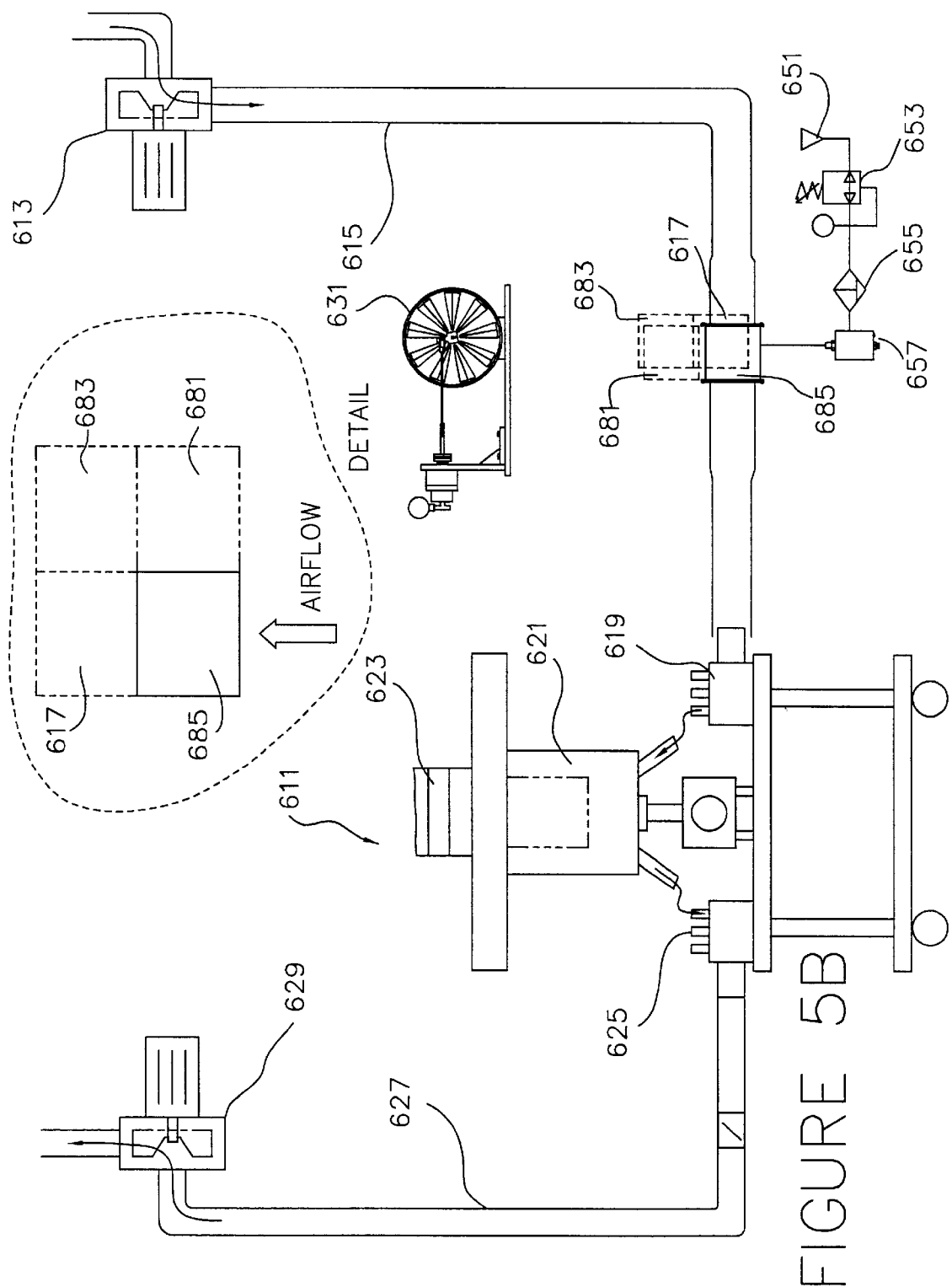
FIGS. 5B and 5C depict a bladder valve which may be utilized in lieu of a rotary valve.

FIG. 5B is a schematic and block diagram representation of an airflow circuit for use in a blown film extrusion system which utilizes an alternative to the rotary valve 129 of FIG. 5A. Input blower 613 is provided to provide a supply of air which is routed into airflow circuit 611. The air is received by conduit 615 and directed to airflow control device 617 of the present invention. Airflow control device 617 operates as a substitute for a conventional rotary-type airflow valve 631, which is depicted in simplified form also in FIG. 5B. The preferred airflow control device 617 of the present invention is employed to increase and decrease the flow of air to supply distributor box 619 which provides an air supply to annular die 621 from which blown film tube 623 extends upward. Air is removed from the interior of blown film tube 623 by exhaust distributor box 625 which routes the air to conduit 627, and eventually to exhaust blower 629.

Figure 5C:
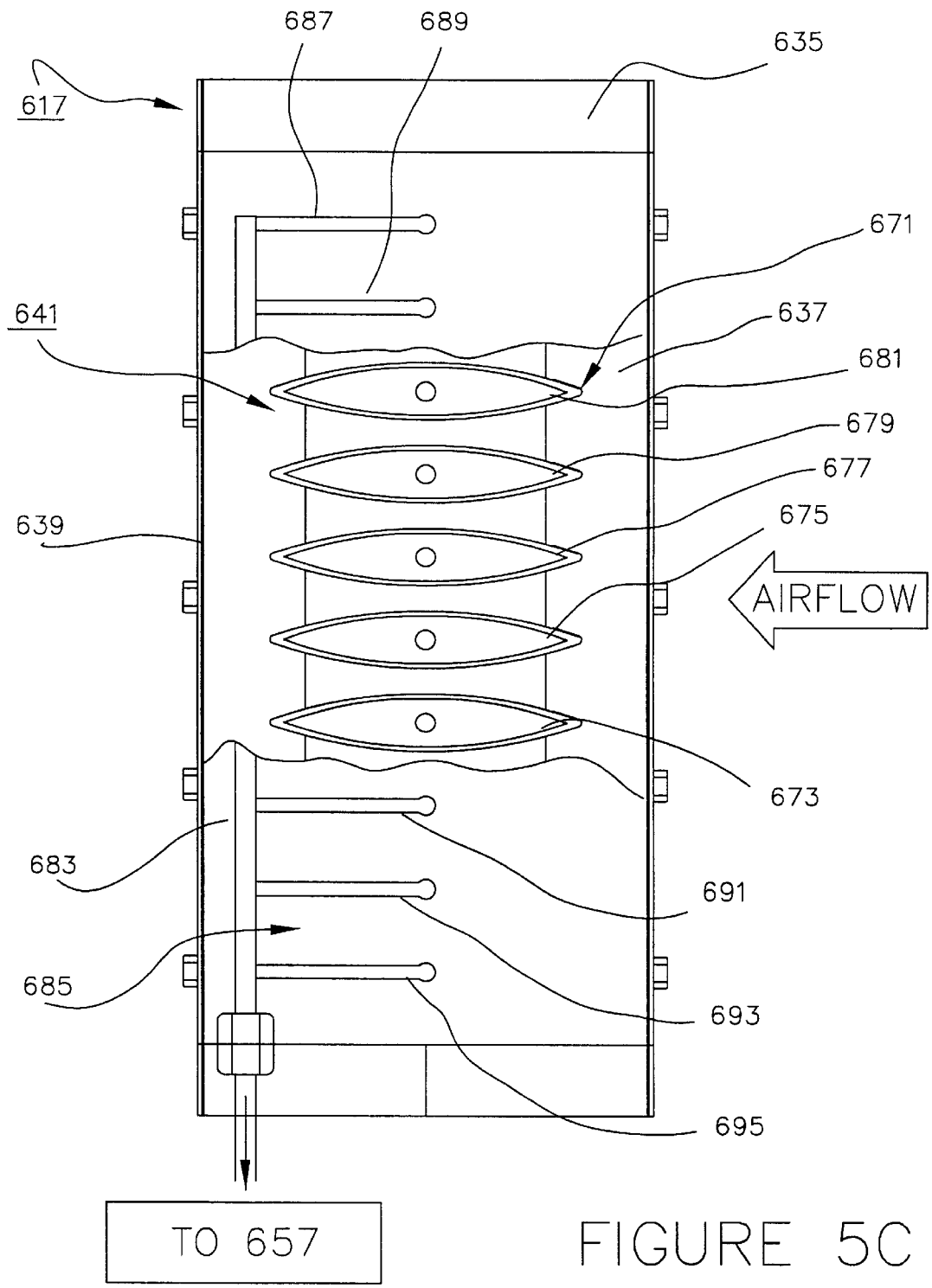

The preferred airflow control device 617 is depicted in fragmentary longitudinal section view in FIG. 5C. As is shown, airflow control device 617 includes housing 635 which defines inlet 637 and outlet 639 and airflow pathway 641 through housing 635. A plurality of selectively expandable flow restriction members 671 are provided within housing 635 in airflow pathway 641. In the view of FIG. 5C, selectively-expandable flow restriction members 673, 675, 677, 679, and 681 are depicted. Other selectively-expandable flow restriction members are obscured in the view of FIG. 5C. Manifold 685 is provided to route pressurized air to the interior of selectively-expandable flow restriction members 671, and includes conduit 683 which couples to a plurality of hoses, such 8 as hoses 687, 689, 691, 693, 695 which are depicted in FIG. 5C (other hoses are obscured in FIG. 5C).

Each of the plurality of selectively-expandable flow restriction members includes an inner air-tight bladder constructed of an expandable material such as an elastomeric material. The expandable bladder is surrounded by an expandable and contractible metal assembly. Preferably, each of the plurality of selective-expandable flow restriction members is substantially oval in cross-section view (such as the view of FIG. 5C), and traverse airflow pathway 641 across the entire width of airflow pathway 641. Air flows over and under each of the plurality of selectively-expandable airflow restriction members, and each of them operates as an choke to increase and decrease the flow of air through housing 635 as they are expanded and contracted. However, the flow restriction is accomplished without creating turbulence in the airflow, since the selectively-actuable flow restriction members are foil shaped.

Returning now to FIG. 5A, airflow control device 617 is coupled to proportional valve 657 which receives either a current or voltage control signal and selectively vents pressurized fluid to airflow control device 617. In the preferred embodiment, proportional valve 657 is manufactured by Proportion Air of McCordsville, Ind. Supply 651 provides a source of pressurized air which is routed through pressure regulator 653 which maintains the pressurized air at a constant 30 pounds per square inch of pressure. The regulated air is directed through filter 655 to remove dust and other particulate matter, and then through proportional valve 657 to airflow control device 617.

In the preferred embodiment of the present invention, airflow control device 617 is manufactured by Tek-Air Systems, Inc. of Northvale, N.J., and is identified as a "Connor Model No. PRD Pneumavalve". This valve is the subject matter of at least two U.S. patents, including U.S. Pat. No. 3,011,518, which issued in December of 1961 to Day et al., and U.S. Pat. No. 3,593,645, which issued on Jul. 20, 1971, to Day et al., which was assigned to Connor Engineering Corporation of Danbury, Conn., and which is entitled "Terminal Outlet for Air Distribution" both of which are incorporated herein by reference as if fully set forth.

Use has revealed that this type of airflow control device provides for greater control than can be provided by rotary type valve 631 (depicted in FIG. 5A for comparison purposes only), and is especially good at providing control in mismatched load situations which would ordinarily be difficult to control economically with a rotary type valve.

A number of airflow control devices like airflow control device 617 can be easily coupled together in either series or parallel arrangement to control the total volume of air provided to a blown film line or to allow economical load matching. In FIG. 5A, a series and a parallel coupling of airflow control devices is depicted in phantom, with airflow control devices 681, 683, and 685 coupled together with airflow control device 617. As shown in the detail airflow control device 617 is in parallel with airflow control device 683 but is in series communication with airflow control device 685. Airflow control device 685 is in parallel communication with airflow control device 681. Airflow control devices 681 and 683 are in series communication.

Figure 6:
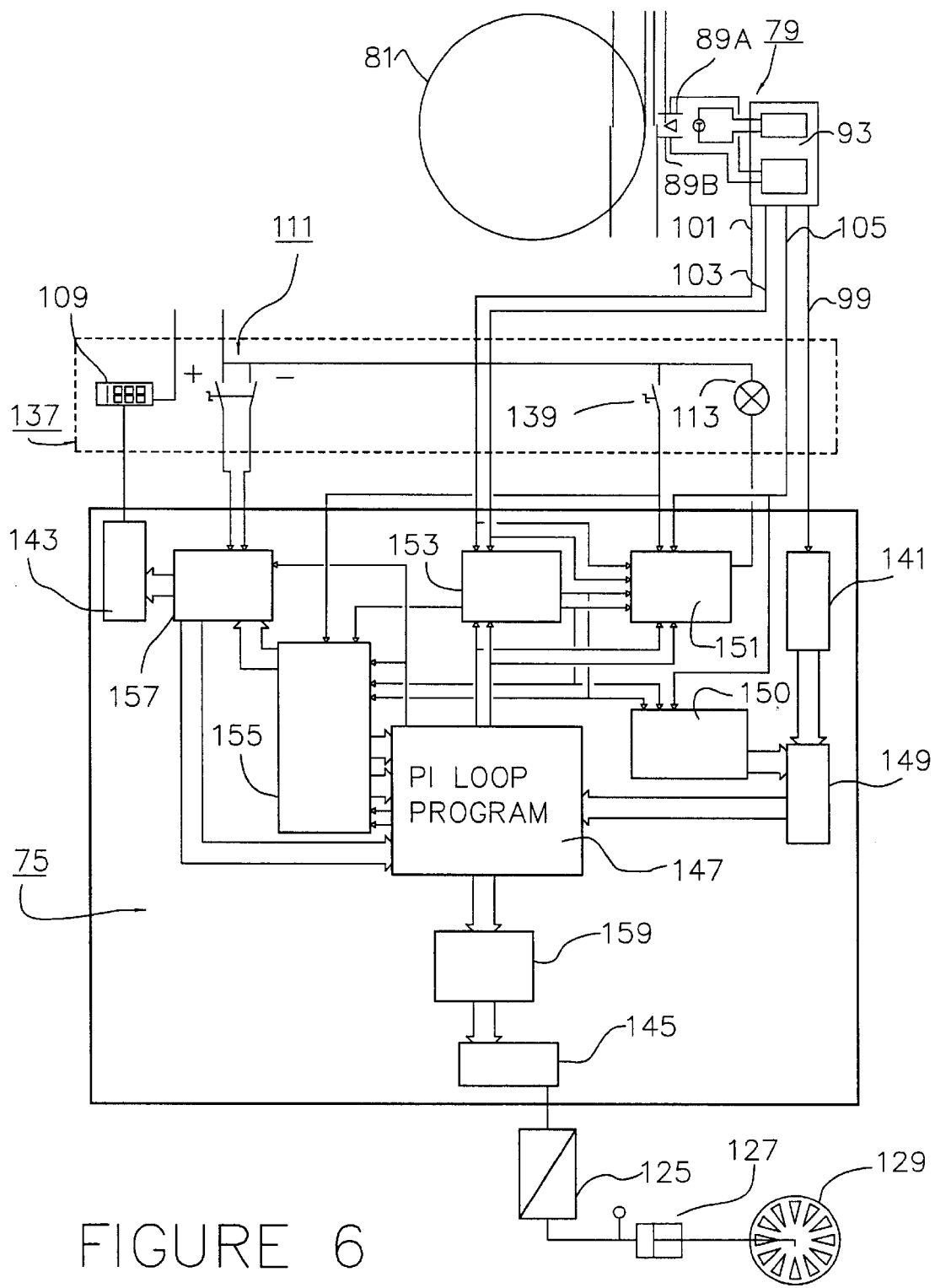
FIG. 6 is a schematic and block diagram view of the preferred control system of FIG. 5, with special emphasis on the supervisory control unit.

FIG. 6 is a schematic and block diagram view of the preferred control system of FIG. 5, with special emphasis on the supervisory control unit 75 and the manner in which it processes the IBC sensor data. Extruded film tube 81 is shown in cross-section with ultrasonic sensor 89 adjacent its outer wall. Ultrasonic sensor 89 emits interrogating pulses which are bounced off of extruded film tube and sensed by ultrasonic sensor 89. The time delay between transmission and reception of the interrogating pulse is processed by transducer electronics 93 to produce four outputs: CURRENT POSITION signal which is provided to supervisory control unit 75 via analog output conductor 99, digital TARGET PRESENT signal which is provided over digital output 105, a minimum override signal (MIO signal) indicative of a collapsing or undersized bubble which is provided over digital output conductor 103, and maximum override signal (MAO signal) indicative of an overblown extruded film tube 81 which is provided over a digital output conductor 101.

Figure 7A:
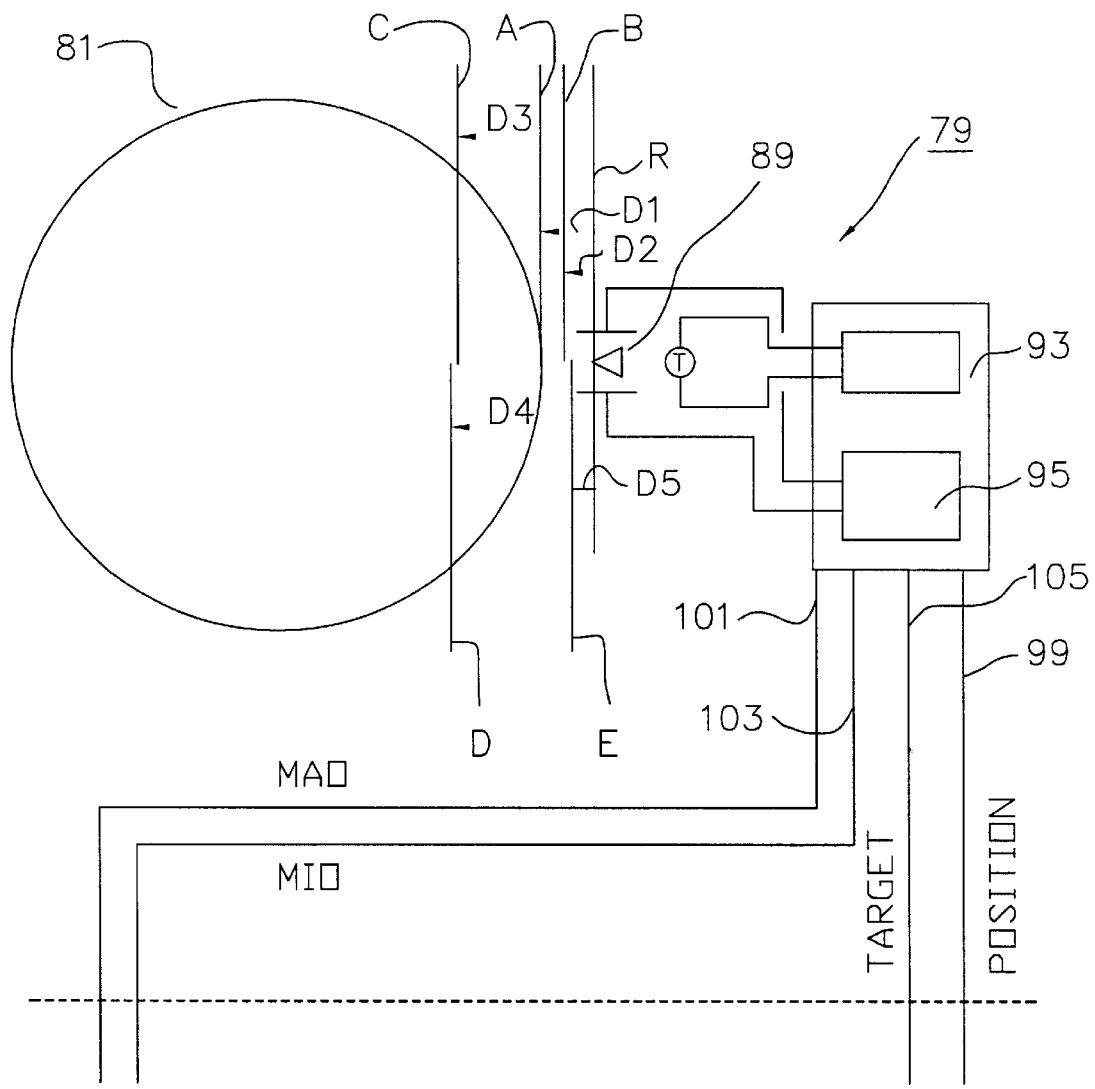
FIG. 7A is a schematic and block diagram view of the signals generated by the ultrasonic sensor which pertain to the position of the blown film layer.

As shown in FIG. 6, the position of extruded film tube 81 relative to ultrasonic sensor 89 is analyzed and controlled with reference to a number of distance thresholds and setpoints, which are shown in greater detail in FIG. 7A. All set points and thresholds represent distances from reference R. The control system of the present invention attempts to maintain extruded film tube 81 at a circumference which places the wall of extruded film tube 81 at a tangent to the line established by reference A. The distance between reference R and set point A may be selected by the user through distance selector 111. This allows the user to control the distance between ultrasonic sensor 89 and extruded film tube 81.

The operating range of acoustic transducer 79 is configurable by the user with settings made in transducer electronics 93. In the preferred embodiment, using the Massa Products transducer, the range of operation of acoustic transducer 79 is between 3 to 24 inches. Therefore, the user may select a minimum circumference threshold C and a maximum circumference threshold B, below and above which an error signal is generated. Minimum circumference threshold C may be set by the user at a distance d3 from reference R. Maximum circumference threshold B may be selected by the user to be a distance d2 from reference R. In the preferred embodiment, setpoint A is set a distance of 7 inches from reference R. Minimum circumference threshold C is set a distance of 10.8125 inches from reference R. Maximum circumference threshold B is set a distance of 4.1 inches from reference R. Transducer electronics 93 allows the user to set or adjust these distances at will provided they are established within the range of operation of acoustic transducer 79, which is between 3 and 24 inches.

Besides providing an analog indication of the distance between ultrasonic sensors 89 and extruded film tube 81, transducer electronics 93 also produces three digital signals which provide information pertaining to the position of extruded film tube 81. If extruded film tube 81 is substantially normal and within the operating range of ultrasonic sensor 89, a digital "1" is provided at digital output 105. The signal is representative of a TARGET PRESENT signal. If extruded film tube 81 is not within the operating range of ultrasonic sensor 89 or if a return pulse is not received due to curvature of extruded film tube 81, TARGET PRESENT signal of digital output 105 is low. As discussed above, digital output 103 is a minimum override signal MIO. If extruded film tube 81 is smaller in circumference than the reference established by threshold C, minimum override signal MIO of digital output 103 is high. Conversely, if circumference of extruded film tube 81 is greater than the reference established by threshold C, the minimum override signal MIO is low.

Digital output 101 is for a maximum override signal MAO. If extruded film tube 81 is greater than the reference established by threshold B, the maximum override signal MAO is high. Conversely, if the circumference of extruded film tube 81 is less than the reference established by threshold B, the output of maximum override signal MAO is low.

The minimum override signal MIO will stay high as long as extruded film tube 81 has a circumference less than that established by threshold C. Likewise, the maximum override signal MAO will remain high for as long as the circumference of extruded film tube 81 remains larger than the reference established by threshold B.

Threshold D and threshold E are also depicted in FIG. 7A. Threshold D is established at a distance d4 from reference R. Threshold E is established at a distance d5 from reference R. Thresholds D and E are established by supervisory control unit 75, not by acoustic transducer 79. Threshold D represents a minimum circumference threshold for extruded film tube 81 which differs from that established by transducer electronics 93. Likewise, threshold E corresponds to a maximum circumference threshold which differs from that established by acoustic transducer 79. Thresholds D and E are established in the software of supervisory control unit 75, and provide a redundancy of control, and also minimize the possibility of user error, since these threshold are established in software, and cannot be easily changed or accidentally changed. The coordination of all of these thresholds will be discussed in greater detail below. In the preferred embodiment, threshold C is established at 10.8125 inches from reference R. Threshold E is established at 3.6 inches from reference R.

Figure 7B:
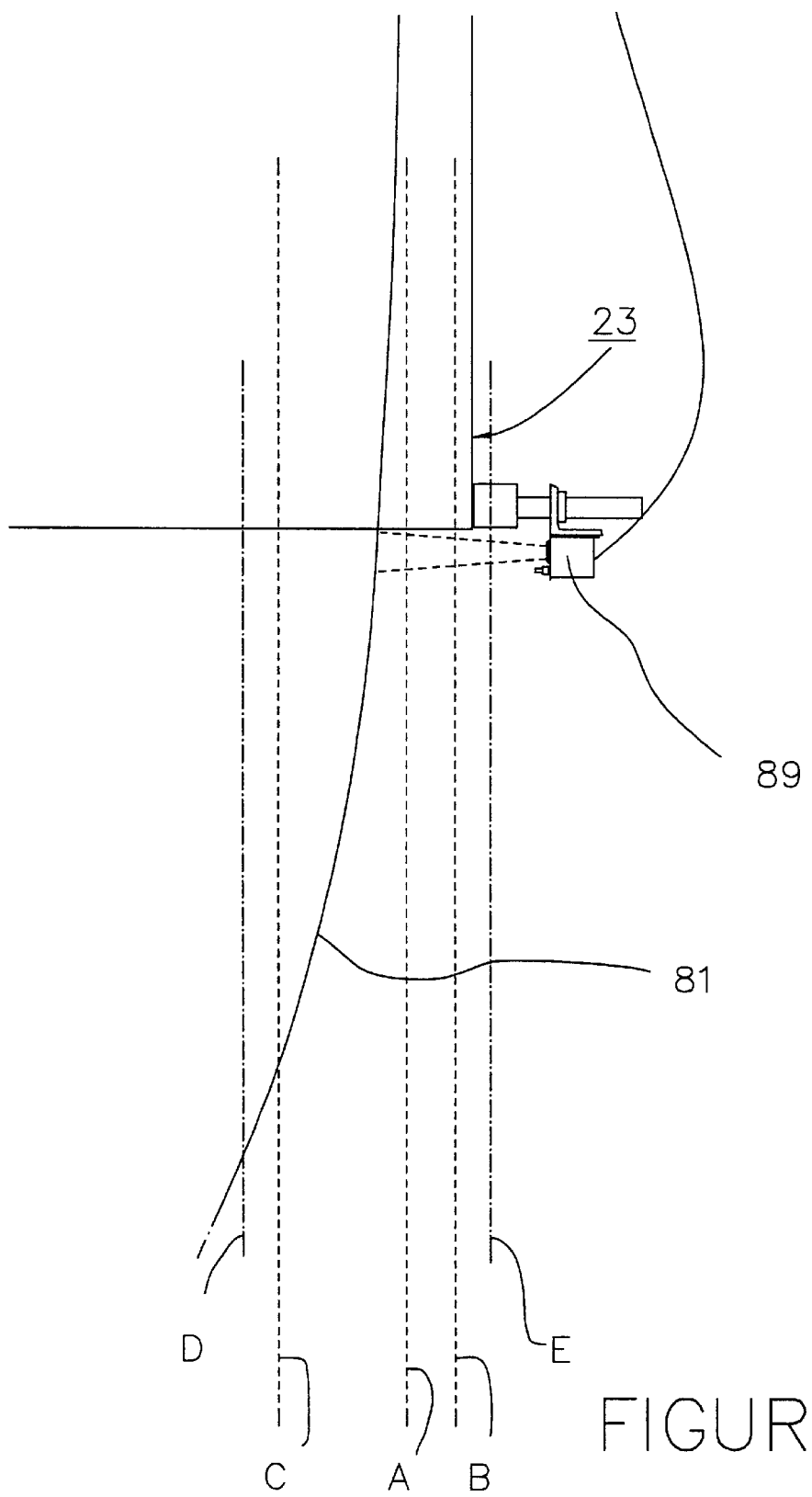
FIG. 7B is a view of the ultrasonic sensor of FIG. 3 coupled to the sizing cage of the blown film tower, with permissible extruded film tube operating ranges indicated thereon.

FIG. 7B is a side view of the ultrasonic sensor 89 coupled to sizing cage 23 of the blown film tower 13, with permissible extruded film tube 81 operating ranges indicated thereon. Setpoint A is the desired distance between ultrasonic sensor 89 and extruded film tube 81. Thresholds D and C are established at selected distances inward from ultrasonic sensor 89, and represent minimum circumference thresholds for extruded film tube 81. Thresholds B and E are established at selected distances from setpoint A, and establish separate maximum circumference thresholds for extruded film tube 81. As shown in FIG. 7B, extruded film tube 81 is not at setpoint A. Therefore, additional air must be supplied to the interior of extruded film tube 81 to expand the extruded film tube 81 to the desired circumference established by setpoint A.

If extruded film tube 81 were to collapse, two separate alarm conditions would be registered. One alarm condition will be established when extruded film tube 81 falls below threshold C. A second and separate alarm condition will be established when extruded film tube 81 falls below threshold D. Extruded film tube 81 may also become overblown. In an overblown condition, two separate alarm conditions are possible. When extruded film tube 81 expands beyond threshold B, an alarm condition is registered. When extruded film tube 81 expands further to extend beyond threshold E, a separate alarm condition is registered.

As discussed above, thresholds C and B are subject to user adjustment through settings in transducer electronics 93. In contrast, thresholds D and E are set in computer code of supervisory control unit 75, and are not easily adjusted. This redundancy in control guards against accidental or intentional missetting of the threshold conditions at transducer electronics 93. The system also guards against the possibility of equipment failure in transducer 79, or gradual drift in the threshold settings due to deterioration, or overheating of the electronic components contained in transducer electronics 93.

Returning now to FIG. 6, operator control panel 137 and supervisory control unit 75 will be described in greater detail. Operator control panel 137 includes setpoint display 109, which serves to display the distance d1 between reference R and setpoint A. Setpoint display 109 includes a 7 segment display. Distance selector 111 is used to adjust setpoint A. Holding the switch to the "+" position increases the circumference of extruded film tube 81 by decreasing distance d1 between setpoint A and reference R. Holding the switch to the "−" position decreases the diameter of extruded film tube 81 by increasing the distance between reference R and setpoint A.

Target indicator 113 is a target light which displays information pertaining to whether extruded film tube 81 is within range of ultrasonic transducer 89, whether an echo is received at ultrasonic transducer 89, and whether any alarm condition has occurred. Blower switch 139 is also provided in operator control panel 137 to allow the operator to selectively disconnect the blower from the control unit. As shown in FIG. 6, all these components of operator control panel 137 are electrically coupled to supervisory control unit 75.

Supervisory control unit 75 responds to the information provided by acoustic transducer 79, and operator control panel 137 to actuate proportional valve 125. Proportional valve 125 in turn acts upon pneumatic cylinder 127 to rotate rotary valve 129 to control the air flow to the interior of extruded film tube 81.

With the exception of analog to digital converter 141, digital to analog converter 143, and digital to analog converter 145 (which are hardware items), supervisory control unit 75 is a graphic representation of computer software resident in memory of supervisory control unit 75. In the preferred embodiment, supervisory control unit 75 comprises an industrial controller, preferably a brand industrial controller Model No. T6000. Therefore, supervisory control unit 75 is essentially a relatively low-powered computer which is dedicated to a particular piece of machinery for monitoring and controlling. In the preferred embodiment, supervisory control unit 75 serves to monitor many other operations of blown film extrusion line 11. The gauging and control of the circumference of extruded film tube 81 through computer software is one additional function which is "piggybacked" onto the industrial controller. Alternately, it is possible to provide an industrial controller or microcomputer which is dedicated to the monitoring and control of the extruded film tube 81. Of course, dedicating a microprocessor to this task is a rather expensive alternative.

For purposes of clarity and simplification of description, the operation of the computer program in supervisory control unit 75 have been segregated into operational blocks, and presented as an amalgamation of digital hardware blocks. In the preferred embodiment, these software subcomponents include: software filter 149, health state logic 151, automatic sizing and recovery logic 153, loop mode control logic 155, volume setpoint control logic 157, and output clamp 159. These software modules interface with one another, and to PI loop program 147 of supervisory control unit 75. PI loop program is a software routine provided in the Control Microsystems T6000 system. The proportional controller regulates a process by manipulating a control element through the feedback of a controlled output. The equation for the output of a PI controller is:

$$m = K^* e + K/T \int e\, dt + ms$$

In this equation:

m=controller output

K=controller gain e=error

T=reset time
dt=differential time
ms=constant
e dt=integration of all previous errors When an error exists, it is summed (integrated) with all the previous errors, thereby increasing or decreasing the output of the PI controller (depending upon whether the error is positive or negative). Thus as the error term accumulates in the integral term, the output changes so as to eliminate the error.

CURRENT POSITION signal is provided by acoustic transducer 79 via analog output 99 to analog to digital converter 141, where the analog CURRENT POSITION signal is digitized. The digitized CURRENT POSITION signal is routed through software filter 149, and then to PI loop program 147. If the circumference of extruded film tube 81 needs to be adjusted, PI loop program 147 acts through output clamp 159 upon proportional valve 125 to adjust the quantity of air provided to the interior of extruded film tube 81.

Figure 8A:
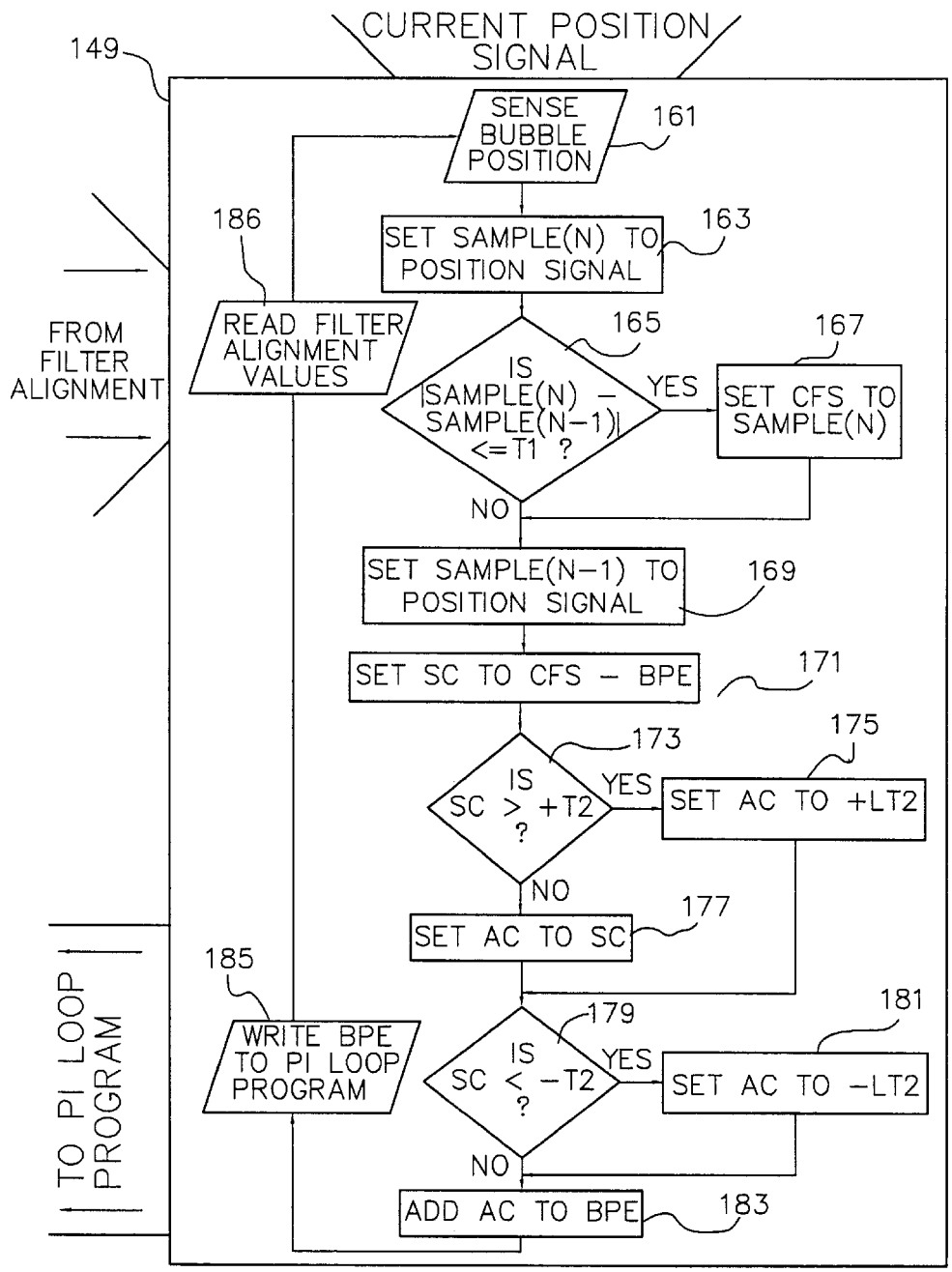
FIG. 8A is a flow chart of the preferred filtering process applied to the current position signal generated by the acoustic transducer.

FIG. 8A is a flowchart of the preferred filtering process applied to CURRENT POSITION signal generated by the acoustic transducer. The digitized CURRENT POSITION signal is provided from analog to digital converter 141 to software filter 149. The program reads the CURRENT POSITION signal in step 161. Then, the software filter 149 sets SAMPLE (N) to the position signal.

In step 165, the absolute value of the difference between CURRENT POSITION (SAMPLE (N)) and the previous sample (SAMPLE (N−1)) is compared to a first threshold. If the absolute value of the difference between the current sample and the previous sample is less than first threshold T1, the value of SAMPLE (N) is set to CFS, the current filtered sample, in step 167. If the absolute value of the difference between the current sample and the previous sample exceeds first threshold T1, in step 169, the CURRENT POSITION signal is disregarded, and the previous position signal SAMPLE (N−1) is substituted in its place.

Then, in step 171, the suggested change SC is calculated, by determining the difference between the current filtered sample CFS and the best position estimate BPE. In step 173, the suggested change SC which was calculated in step 171 is compared to positive T2, which is the maximum limit on the rate of change. If the suggested change is within the maximum limit allowed, in step 177, allowed change AC is set to the suggested change SC value. If, however, in step 173, the suggested change exceeds the maximum limit allowed on the rate of change, in step 175, the allowed change is set to +LT2, a default value for allowed change.

In step 179, the suggested change SC is compared to the negative limit for allowable rates of change, negative T2. If the suggested change SC is greater than the maximum limit on negative change, in step 181, allowed change AC is set to negative −LT2, a default value for negative change. However, if in step 179 it is determined that suggested change SC is within the maximum limit allowed on negative change, in step 183, the allowed change AC is added to the current best position estimate BPE, in step 183. Finally, in step 185, the newly calculated best position estimate BPE is written to the PI loop program.

Software filter 149 is a two stage filter which first screens the CURRENT POSITION signal by comparing the amount of change, either positive or negative, to threshold T1. If the CURRENT POSITION signal, as compared to the preceding position signal exceeds the threshold of T1, the current position signal is discarded, and the previous position signal (SAMPLE (N−1)) is used instead. At the end of the first stage, in step 171, a suggested change SC value is derived by subtracting the best position estimate BPE from the current filtered sample CFS.

In the second stage of filtering, the suggested change SC value is compared to positive and negative change thresholds (in steps 173 and 179). If the positive or negative change thresholds are violated, the allowable change is set to a preselected value, either +LT2, or −LT2. Of course, if the suggested change SC is within the limits set by positive T2 and negative T2, then the allowable change AC is set to the suggested change SC.

Figure 8B:
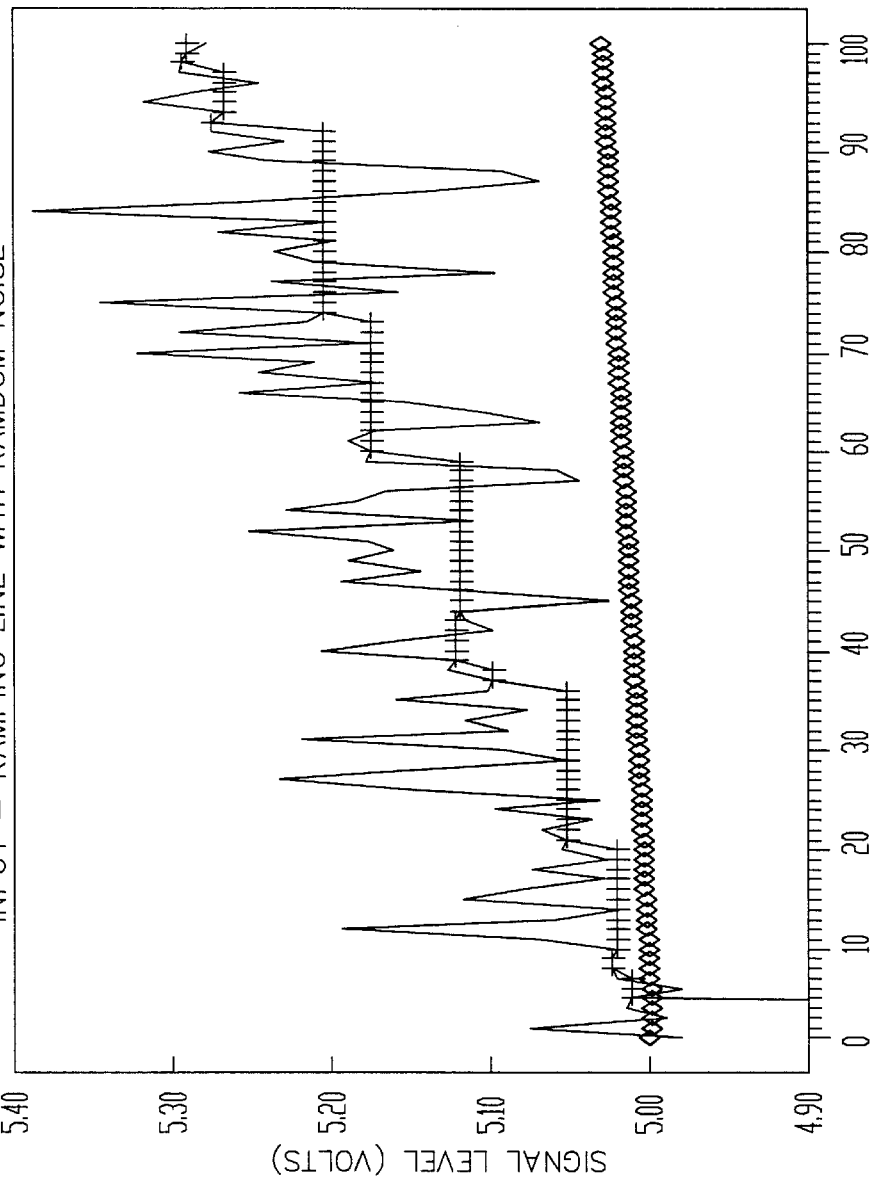
FIG. 8B is a graphic depiction of the operation of the filtering system.

The operation of software filter 149 may also be understood with reference to FIG. 8B. In the graph of FIG. 8B, the y-axis represents the signal level, and the x-axis represents time. The signal as sensed by acoustic transducer 79 is designated as input, and shown in the solid line. The operation of the first stage of the software filter 149 is depicted by the current filtered sample CFS, which is shown in the graph by cross-marks. As shown, the current filtered sample CFS operates to ignore large positive or negative changes in the position signal, and will only change when the position signal seems to have stabilized for a short interval. Therefore, when changes occur in the current filtered sample CFS, they occur in a plateau-like manner.

In stage two of the software filter 149, the current filtered sample CFS is compared to the best position estimate BPE, to derive a suggested change SC value. The suggested SC is then compared to positive and negative thresholds to calculate an allowable change AC which is then added to the best position estimate BPE. FIG. 8B shows that the best position estimate BPE signal only gradually changes in response to an upward drift in the POSITION SIGNAL. The software filtering system 149 of the present invention renders the control apparatus relatively unaffected by random noise, but capable of tracking the more "gradual" changes in bubble position.

Experimentation has revealed that the software filtering system of the present invention operates best when the position of extruded film tube 81 is sampled between 20 to 30 times per second. At this sampling rate, one is less likely to incorrectly identify noise as a change in circumference of extruded film tube 81. The preferred sampling rate accounts for the common noise signals encountered in blown film extrusion liner.

Optional thresholds have also been derived through experimentation. In the first stage of filtering, threshold T1 is established as roughly one percent of the operating range of acoustic transducer 79, which in the preferred embodiment is twenty-one meters (24 inches less 3 inches). In the second stage of filter, thresholds +LT2 and −LT2 are established as roughly 0.30% of the operating range of acoustic transducer 79.

Figure 9:
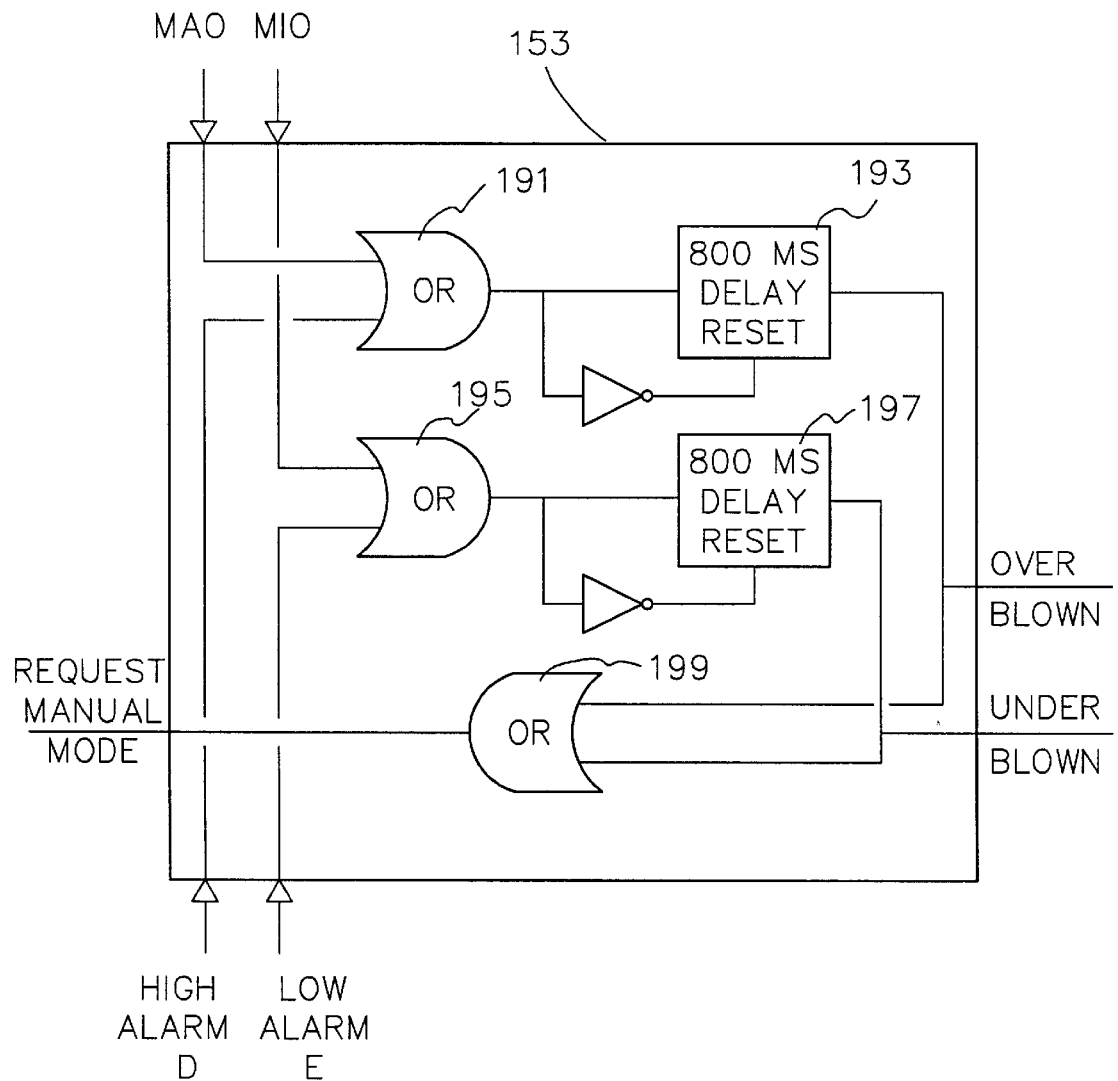
FIG. 9 is a schematic representation of the automatic sizing and recovery logic (ASRL) of FIG. 6.

FIG. 9 is a schematic representation of the automatic sizing and recovery logic ASRL of supervisory control unit 75. As stated above, this figure is a hardware representation of a software routine. ASRL 153 is provided to accommodate the many momentary false indications of maximum and minimum circumference violations which may be registered due to noise, such as the noise created due to air flow between acoustic transducer 79 and extruded film tube 81. The input from maximum alarm override MAO is "ored" with high alarm D, from the PI loop program, at "or" operator 191. High alarm D is the signal generated by the program in supervisory control unit 75 when the circumference of extruded film tube 81 exceeds threshold D of FIG. 7A. If a maximum override MAO signal exists, or if a high alarm condition D exists, the output of "or" operator 191 goes high, and actuates delay timer 193.

Likewise, minimum override MIO signal is "ored" at "or" operator 195 with low alarm E. If a minimum override signal is present, or if a low alarm condition E exists, the output of "or" operator 195 goes high, and is directed to delay timer 197. Delay timers 193, 197 are provided to prevent an alarm condition unless the condition is held for 800 milliseconds continuously. Every time the input of delay timers 193, 197 goes low, the timer resets and starts from 0. This mechanism eliminates many false alarms.

If an alarm condition is held for 800 milliseconds continuously, an OVERBLOWN or UNDERBLOWN signal is generated, and directed to the health state logic 151. Detected overblown or underblown conditions are "ored" at "or" operator 199 to provide a REQUEST MANUAL MODE signal which is directed to loop mode control logic 155.

Figure 10:
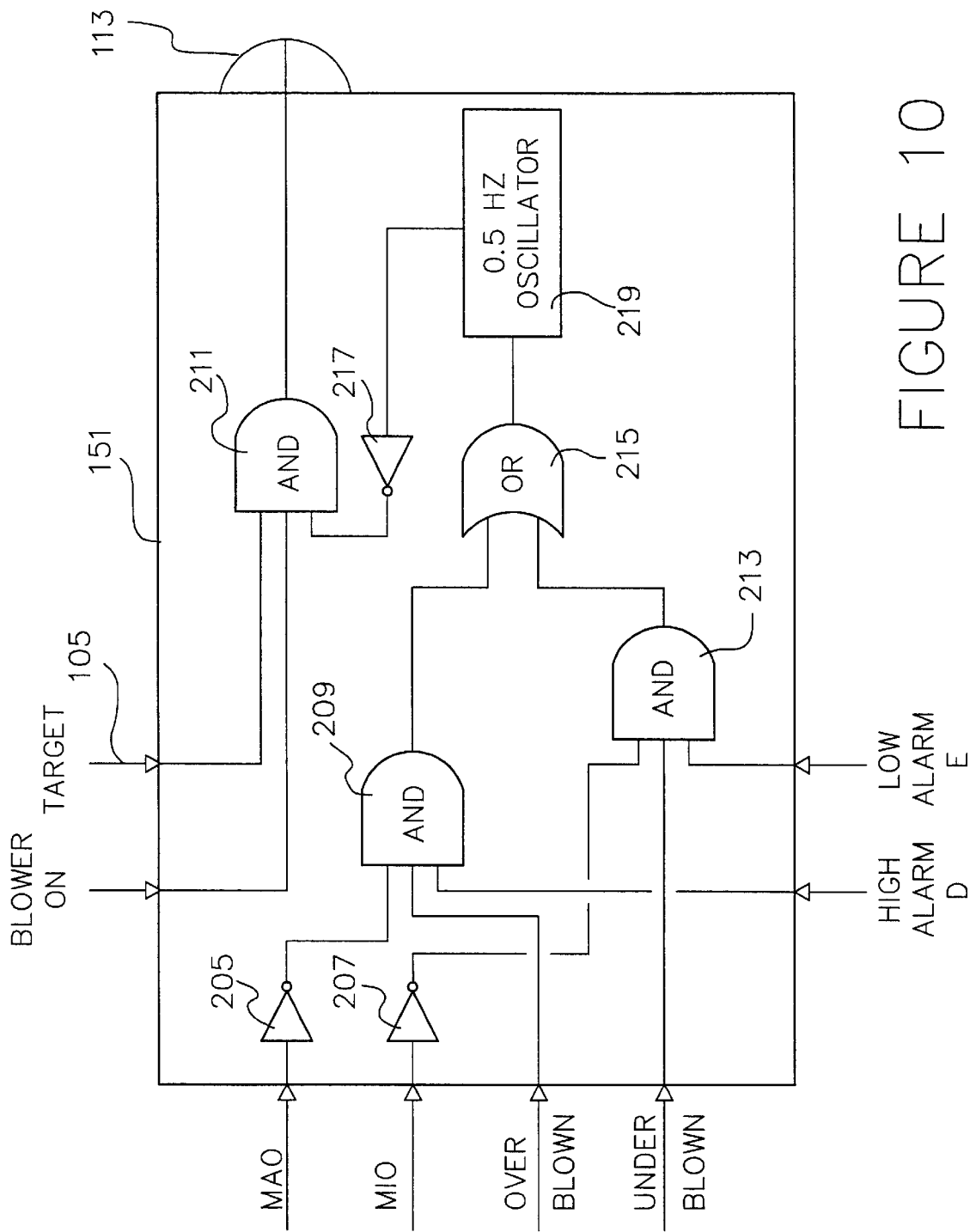
FIG. 10 is a schematic representation of the health/state logic (HSL) of FIG. 6.

FIG. 10 is a schematic representation of the health-state logic 151 of FIG. 6. The purpose of this logic is to control the target indicator 113 of operator control panel 137. When in non-error operation, the target indicator 113 is on if the blower is on, and the TARGET PRESENT signal from digital output 105 is high. When an error is sensed in the maximum override MAO or minimum override MIO lines, the target indicator 113 will flash on and off in one half second intervals.

In health-state logic HSL 151, the maximum override signal MAO is inverted at inverter 205. Likewise, the minimum override signal is inverted at inverter 207.

"And" operator 209 serves to "and" the inverted maximum override signal MAO, with the OVERBLOWN signal, and high alarm signal D. A high output from "and" operator 209 indicates that something is wrong with the calibration of acoustic transducer 79.

Likewise, "and" operator 213 serves to "and" the inverted minimum override signal MIO, with the OVERBLOWN signal, and low alarm signal E. If the output of "and" operator 213 is high, something is wrong with the calibration of acoustic transducer 79. The outputs from "and" operators 209, 213 are combined in "or" operator 215 to indicate an error with either the maximum or minimum override detection systems. The output of "or" operator 215 is channeled through oscillator 219, and inverted at inverter 217. "And" operator 211 serves to "and" the TARGET PRESENT signal, blower signal, and inverted error signal from "or" operator 215. The output of "and" operator of 211 is connected to target indicator 113.

If acoustic transducer 79 is properly calibrated, the target is within range and normal to the sonic pulses, and the blower is on, target indicator 113 will be on. If the target is within range and normal to the sonic pulses, the blower is on, but acoustic transducer 79 is out of calibration, target indicator 113 will be on, but will be blinking. The blinking signal indicates that acoustic transducer 79, and in particular transducer electronics 93, must be recalibrated.

Figure 11:
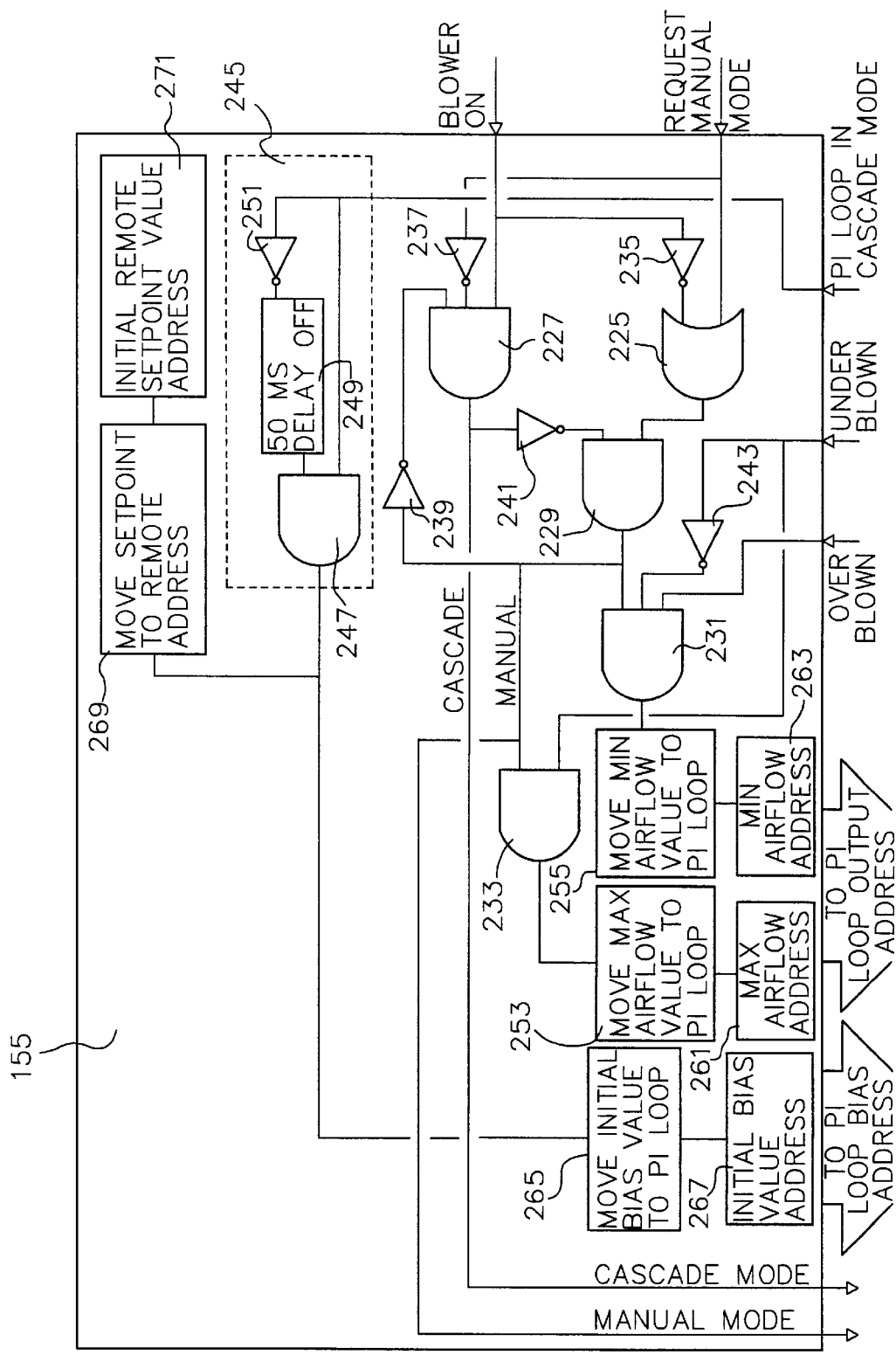
FIG. 11 is a schematic representation of the loop mode control logic (LMCL) of FIG. 6.

FIG. 11 is a schematic representation of loop mode control logic LMCL of FIG. 6. The purpose of this software module is coordinate the transition in modes of operation. Specifically, this software module coordinates automatic startup of the blown film extrusion process, as well as changes in mode between an automated "cascade" mode and a manual mode, which is the required mode of the PI controller to enable under and overblown conditions of the extruded film tube 81 circumference. The plurality of input signals are provided to loop mode control logic 155, including: BLOWER ON, REQUEST MANUAL MODE, PI LOOP IN CASCADE MODE, UNDERBLOWN and OVERBLOWN. Loop mode control logic LMCL 155 provides two output signals: MANUAL MODE, and CASCADE MODE.

FIG. 11 includes a plurality of digital logic blocks which are representative of programming operations. "Or" operator 225 "ores" the inverted BLOWER ON SIGNAL to the REQUEST MANUAL MODE SIGNAL. "And" operator 227 "ands" the inverted REQUEST MANUAL MODE SIGNAL with an inverted MANUAL MODE SIGNAL, and the BLOWER ON SIGNAL. "And" operator 229 "ands" the REQUEST MANUAL MODE SIGNAL to the inverted CASCADE MODE SIGNAL. This prevents MANUAL MODE and CASCADE MODE from both being on at the same time. "And" operator 231 "ands" the MANUAL MODE SIGNAL, the inverted UNDERBLOWN SIGNAL, and the OVERBLOWN SIGNAL. "And" operator 233 "ands" the MANUAL MODE SIGNAL with the UNDERBLOWN SIGNAL. This causes the overblown condition to prevail in the event a malfunction causes both underblown and overblown conditions to be on. Inverters 235, 237, 239, 241, and 243 are provided to invert the inputted output signals of loop mode control logic 155 were needed. Software one-shot 245 is provided for providing a momentary response to a condition. Software one-shot 245 includes "and" operator 247, off-delay 249, and inverter 251.

The software of loop mode control logic 155 operates to ensure that the system is never in MANUAL MODE, and CASCADE MODE at the same time. When manual mode is requested by REQUEST MANUAL MODE, loop mode control logic 155 causes MANUAL MODE to go high. When manual mode is not requested, loop mode control logic 155 operates to cause CASCADE MODE to go high. MANUAL MODE and CASCADE MODE will never be high at the same time. Loop mode control logic 155 also serves to ensure that the system provides a "bumpless transfer" when mode changes occur. The term "cascade mode" is understood in the automation industries as referring to an automatic mode which will read an adjustable setpoint.

Loop mode control logic 155 will also allow for automatic startup of the blown film extrusion process. At startup, UNDERBLOWN SIGNAL is high, PI LOOP IN CASCADE MODE is low, BLOWER ON SIGNAL is high. These inputs (and inverted inputs) are combined at "and" operators 231, 233. At startup, "and" operator 233 actuates logic block 253 to move the maximum air flow value address to the PI loop step 261. At startup, the MANUAL MODE SIGNAL is high. For the PI loop controller of the preferred embodiment, when MANUAL MODE is high, the value contained in PI loop output address is automatically applied to proportional valve 125. This results in actuation of proportional valve 125 to allow maximum air flow to start the extruded film tube 81.

When extruded film tube 81 extends in size beyond the minimum threshold (C and D of FIG. 7A), the UNDERBLOWN SIGNAL goes low, and the PI LOOP IN CASCADE MODE signal goes high. This causes software one-shot 245 to trigger, causing logic blocks 265, 267 to push an initial bias value contained in a program address onto the PI loop. Simultaneously, logic blocks 269, 271 operate to place the selected setpoint value A onto volume-setpoint control logic VSCL 157. Thereafter, volume-setpoint control logic VSCL 157 alone serves to communicate changes in setpoint value A to PI loop program 147.

If an overblown or underblown condition is detected for a sufficiently long period of time, the controller will request a manual mode by causing REQUEST MANUAL MODE SIGNAL to go high. If REQUEST MANUAL MODE goes high, loop mode control logic LMCL 155 supervises the transfer through operation of the logic blocks.

Loop mode control logic LMCL 155 also serves to detected overblown and underblown conditions. If an overblown or underblown condition is detected by the control system, REQUEST MANUAL MODE goes high, and the appropriate OVERBLOWN or UNDERBLOWN signal goes high. The logic operators of loop mode control logic LMCL 155 operate to override the normal operation of the control system, and cause maximum or minimum air flow by putting the maximum air flow address 261 or minimum air flow address 263 to the PI output address. As stated above, when MANUAL MODE is high, these maximum or minimum air flow address values are outputted directly to proportional valve 125. Thus, when the extruded film tube 81 is overblown, loop mode control logic LMCL 155 operates to immediately cause proportional valve 125 to minimize air flow to extruded film tube 81. Conversely, if an underblown condition is detected, loop mode control logic LMCL 155 causes proportional valve 125 to immediately maximize air flow to extruded film tube 81.

Figure 12:
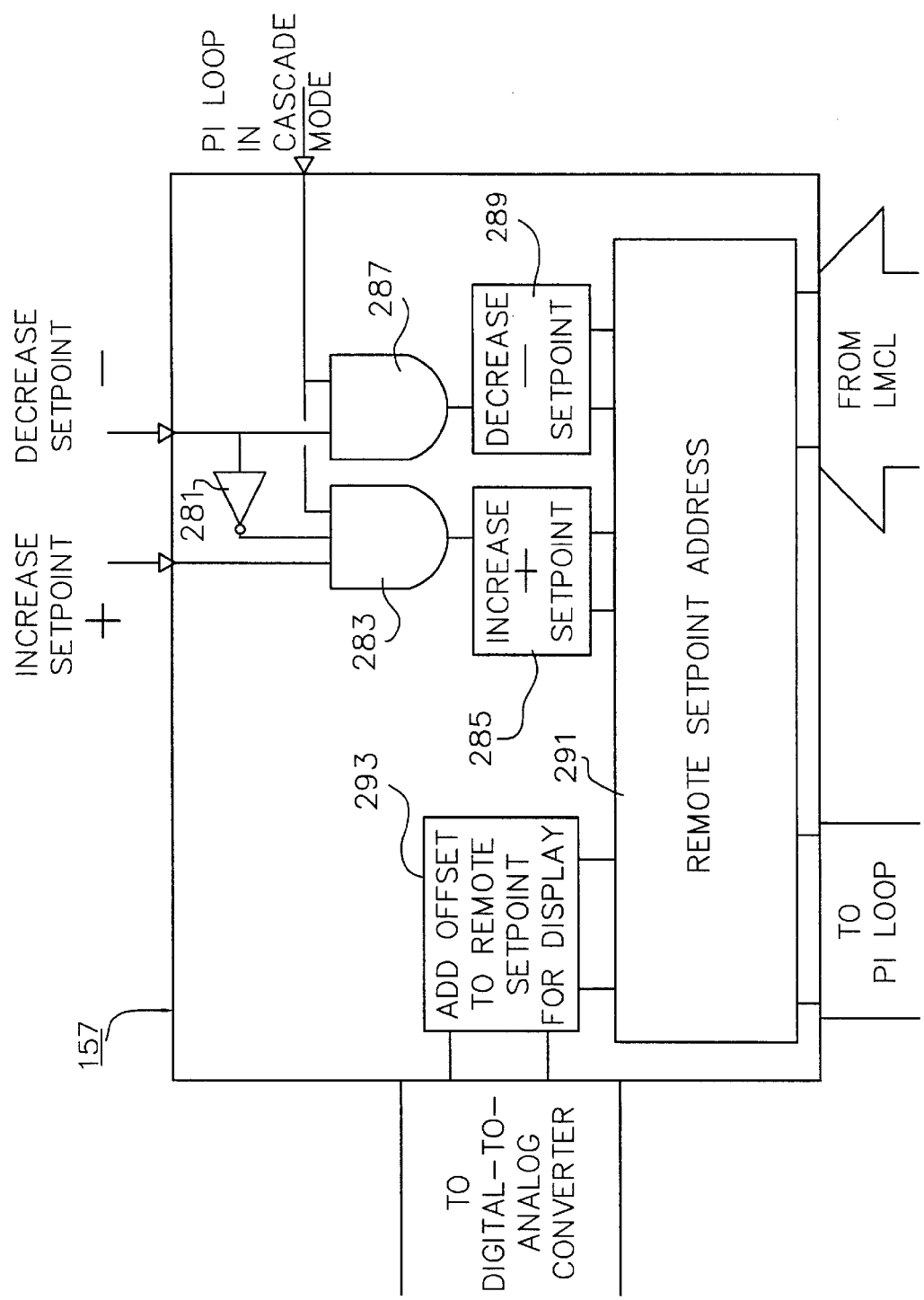
FIG. 12 is a schematic representation of the volume setpoint control logic (VSCL) of FIG. 6.

FIG. 12 depicts the operation of volume-setpoint control logic VSCL 157.

Volume setpoint control logic VSCL 157 operates to increase or decrease setpoint A in response to changes made by the operator at distance selector 111 of operator control panel 137, when the PI loop program 147 is in cascade mode, i.e. when PI LOOP IN CASCADE MODE signal is high. The INCREASE SETPOINT, DECREASE SETPOINT, and PI LOOP IN CASCADE MODE signals are logically combined at "and" operators 283, and 287. These "and" operators act on logic blocks 285, 289 to increase or decrease the setpoint contained in remote setpoint address 291. When the setpoint is either increased or decreased, logic block 293 operates to add the offset to the remote setpoint for display, and forwards the information to digital to analog converter 143, for display at setpoint display 109 of operator control panel 137. The revised remote setpoint address is then read by the PI loop program 147.

Figure 13:
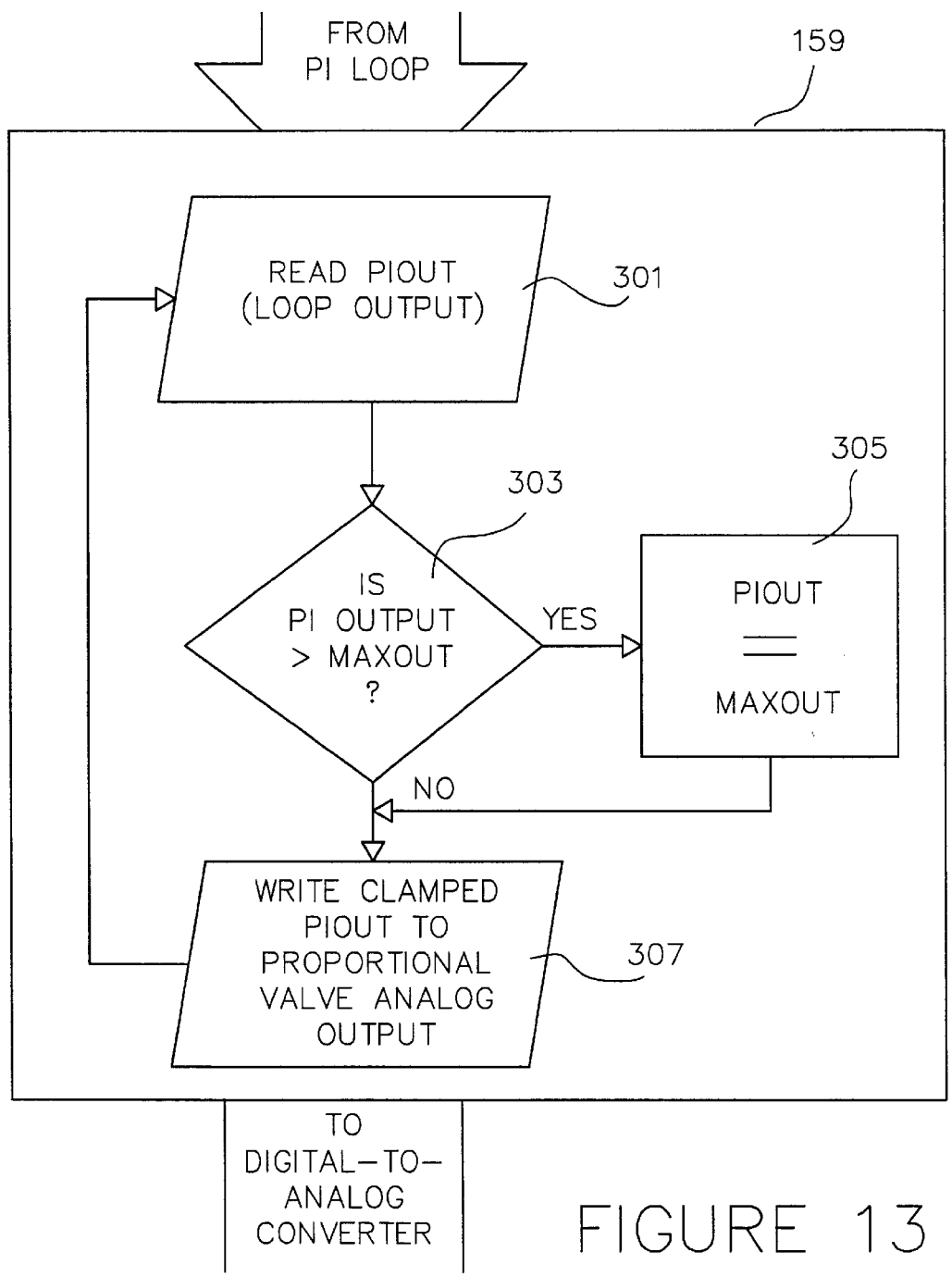
FIG. 13 is a flow chart representation of the output clamp of FIG. 6.

FIG. 13 is a flowchart drawing of output clamp 159. The purpose of this software routine is to make sure that the PI loop program 147 does not over drive the rotary valve 129 past a usable limit. Rotary valve 129 operates by moving a vane to selectively occlude stationary openings. If the moving vane is over driven, the rotary valve will begin to open when the PI loop calls for complete closure. In step 301, the output of the PI loop program 147 is read. In step 303, the output of PI loop is compared to a maximum output. If it exceeds the maximum output, the PI output is set to a predetermined maximum output in step 305. If the output of PI loop does not exceed the maximum output, in step 307, the clamped PI output is written to the proportional valve 125 through digital to analog converter 145.

Figure 14:
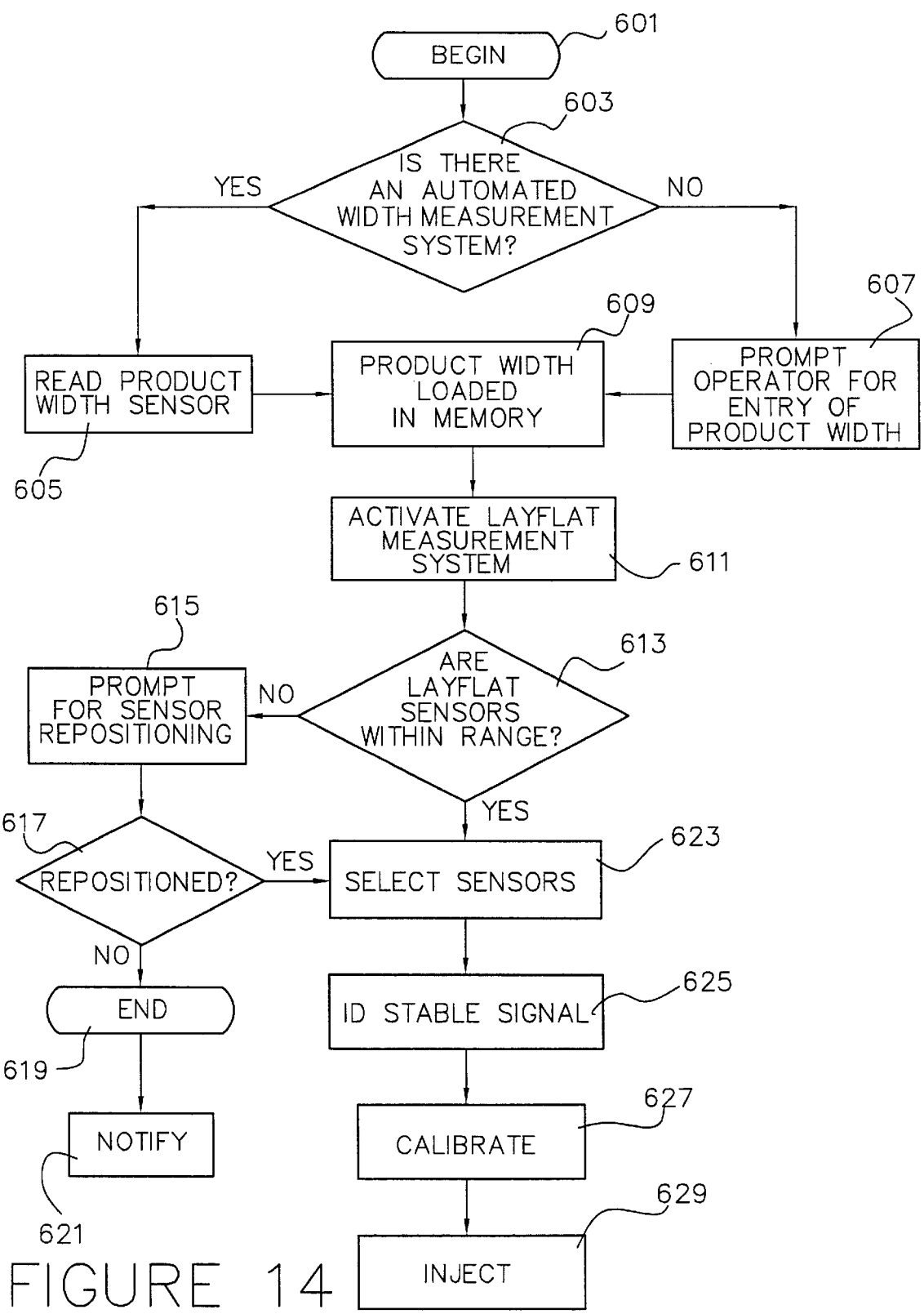
FIG. 14 is a flow chart representation of the integration of the lay flat control loop into an internal bubble control (IBC) system.

The operation of the lay-flat control loop will now be described with reference to FIGS. 14 and 15. FIG. 14 is a flow chart representation of the overall process of implementing the preferred lay-flat control loop in accordance with the preferred embodiment of the present invention. The process is a supplemental process to the primary IBC control loop. The computer implemented steps are executed utilizing the processor which is utilized for the IBC control loop. As is shown in FIG. 14, the process begins at block 601. In step 603, the processor determines whether or not there is an automated measurement system for measuring the width of the final product as accumulated or spooled. If such an automated system exists, then control passes to block 605 wherein the width measure is read from the the automated system. If no such automated system exists, then control passes to block 607, wherein the operator is prompted to enter the product width.

Once the product width information is obtained, in accordance with block 609, the measure is loaded in memory. Then in accordance with block 611, the lay-flat measurement system is activated to provide dynamic and real time information about the product diameter. In block 613, the controller determines whether or not the lay-flat sensors are in range. If the sensors are not in range, control passes to block 615 wherein the operator is prompted to reposition the acoustic sensors so that they are in range. After repositioning is confirmed in block 617, control passes to block 623; however, if repositioning is not confirmed, then the process ends in accordance with block 619 and a warning is given in accordance with block 621. Such warning can be a simple beeping sound or a blinking light, whatever is deemed sufficient to provide the operator with a warning.

Next in accord with block 623, the particular sensors which will be utilized are selected. Then in accordance with block 625, the processor monitors the output signals of all of the available sensors in order to determine which signals are the most stable and reliable. Signal rate of change is a good way to identify the best sensors, with high rates of change indicating a poor sensor. Next the most reliable signals are calibrated to match the scale of the signal provided to the control system by the IBC sensor. Then in accordance with block 629, the error signal developed by the lay-flat sensors are injected into the feedback loop in order to supplement the feed back loop of the IBC control loop.

Figure 15:
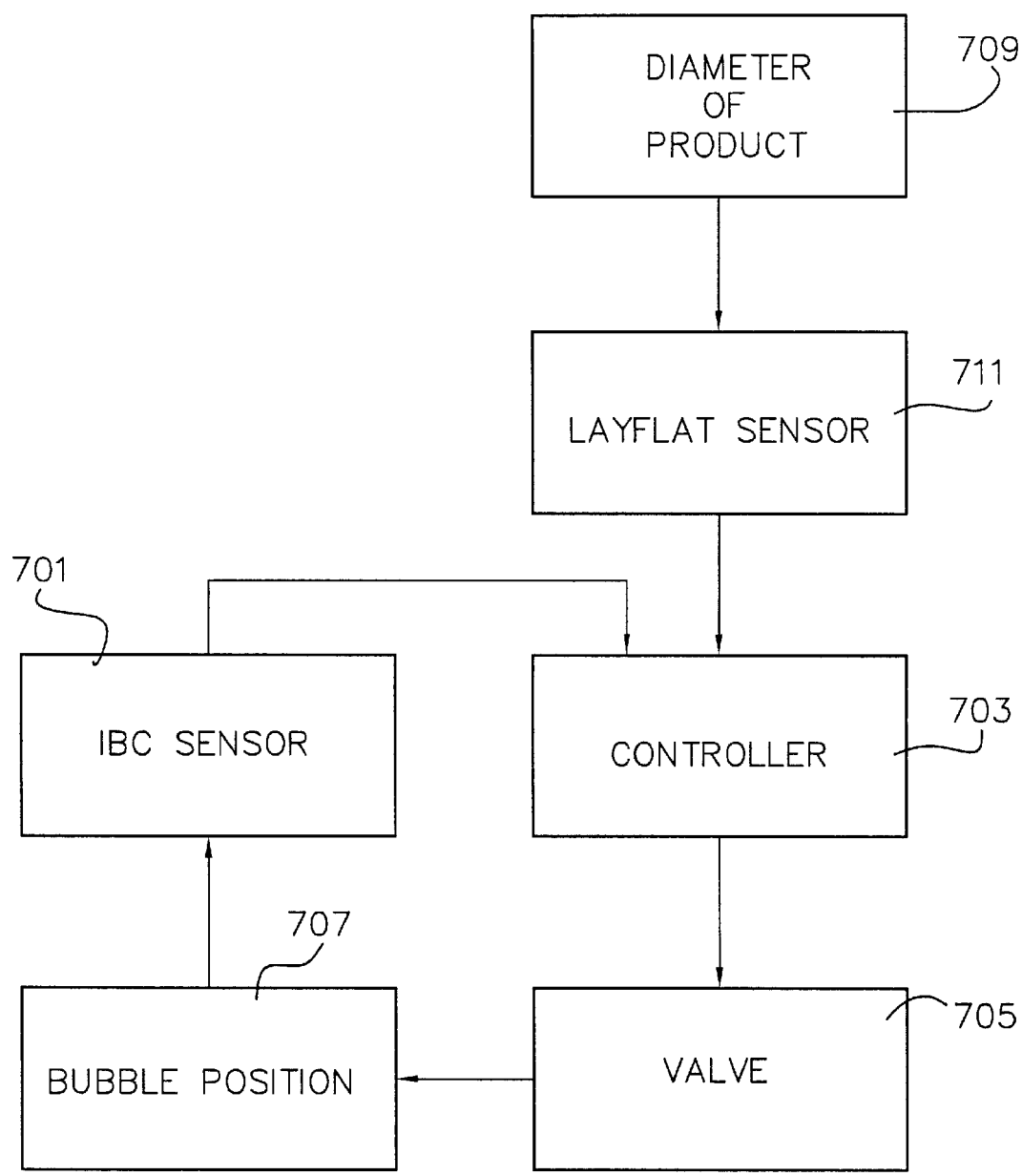
FIG. 15 is a block diagram representation of the combination of control loops.

FIG. 15 depicts the process in a high level block diagram. IBC sensor monitors bubble position 707 and provides a feed back signal to controller 703. Controller 703 supplies a control signal to valve 705. This will have an impact on the bubble position 707. In accordance with the present invention, lay-flat sensor 711 monitors the diameter or width of the hardened product prior to collapsing and provides a similar input to controller 703. Together the feed back signals form IBC sensor 701 and lay-flat sensor 711 allows better and more timely control over the diameter of the finished product than can be accomplished with the prior art approaches.

What is claimed is:

1. An apparatus for producing an extruded film tube and supplying said tube to a collapsing and roller assembly, comprising:
   (a) a die for extruding a molten material in the form of a tube which is in a molten state below a frost line and which is in a solid state above said frost line;
   (b) a blower system for supplying and exhausting cooling air to and from an interior portion of said tube;
   (c) a flow control valve for regulating the at least a portion of said blower system to control the extrusion and cooling process, and which determines in part the circumference of said tube;
   (d) at least one sizing sensor located proximate said tube in a position below said frost line for sensing the position of said tube, comparing such position to an extrusion set point, and generating an extrusion feedback error signal which is corrective of any difference between said position and said set point;
   (e) at least one lay flat sensor located proximate said tube in a position above said frost line for sensing the position of said tube prior to the collapsing and flattening of said tube by said collapsing and roller assembly, comparing said position to a lay-flat set point, and generating a lay-flat feedback error signal which is corrective of any difference between said position and said lay-flat set point;
   (f) a programmable controller for executing program instructions including a negative feedback control system which receives said extrusion feedback error signal and said lay-flat feedback error signal as negative feedback injection signals and which provides a control signal to said valve.

2. An apparatus according to claim 1, wherein said at least one sizing sensor and said at least one lay flat sensor are maintained in different circumferential positions relative to said tube.

3. An apparatus according to claim 1, wherein said lay-flat feedback error signal is provided in the same units as said extrusion feedback error signal.

4. An apparatus according to claim 1, wherein said extrusion feedback error signal defines a primary control feedback control loop, and wherein said lay-flat feedback error signal defines a supplemental feedback control loop.

5. An apparatus according to claim 1, wherein said lay-flat feedback error signal is injected directly into said extrusion feedback control loop.

6. An apparatus according to claim 1, wherein said lay-flat feedback error signal is analyzed prior to injection to determine if it is within a range of acceptable positions.

7. An apparatus according to claim 1, wherein said lay-flat feedback error signal is analyzed prior to injection to determine if it is within an acceptable range of signal rates of change.

8. An apparatus for producing an extruded film tube and supplying said tube to a collapsing and roller assembly, comprising:
   (a) a die for extruding a molten material in the form of a tube which is in a molten state below a frost line and in a solid state above said frost line;
   (b) a blower system for supplying and exhausting cooling air to and from an interior portion of said tube;
   (c) a valve for regulating the at least a portion of said blower system to control the extrusion and cooling process, and which determines in part the circumference of said tube;
   (d) at least one acoustic sensor located proximate said tube in a position below said frost line for sensing the position of said tube, comparing such position to an extrusion set point, and generating an extrusion feedback error signal which is corrective of any difference between said position and said set point;
   (e) at least one non-contact sensor located proximate said tube in a position above said frost line for sensing the position of said tube prior to the collapsing and flattening of said tube by said collapsing and roller assembly, comparing said position to a lay-flat set point, and generating a lay-flat feedback error signal which is corrective of any difference between said position and said lay-flat set point;
   (f) a programmable controller for executing program instructions including a negative feedback control system which receives said extrusion feedback error signal and said lay-flat feedback error signal as negative feedback injection signals and which provides a control signal to said valve.

9. An apparatus according to claim 8, wherein said at least one acoustic sensor and said at least one non-contact sensor are maintained in different circumferential positions relative to said tube.

10. An apparatus according to claim 8, wherein said lay-flat feedback error signal is provided in the same units as said extrusion feedback error signal.

11. An apparatus according to claim 8, wherein said extrusion feedback error signal defines a primary control feedback control loop, and wherein said lay-flat feedback error signal defines a supplemental feedback control loop.

12. An apparatus according to claim 8, wherein said lay-flat feedback error signal is injected directly into said extrusion feedback control loop.

13. An apparatus according to claim 8, wherein said lay-flat feedback error signal is analyzed prior to injection to determine if it is within a range of acceptable positions.

14. An apparatus according to claim 8, wherein said lay-flat feedback error signal is analyzed prior to injection to determine if it is within an acceptable range of signal rates of change.

15. A method of producing an extruded film tube and supplying said tube to a collapsing and roller assembly, comprising:
   (a) extruding a molten material from a die in the form of a tube which is in a molten state below a frost line and in a solid state above said frost line;
   (b) utilizing a blower system for supplying and exhausting cooling air to and from an interior portion of said tube;
   (c) utilizing a flow control valve for regulating the at least a portion of said blower system to control the extrusion and cooling process, and which determines in part the circumference of said tube;
   (d) locating at least one acoustic sensor proximate said tube in a position below said frost line for sensing the position of said tube;
   (e) comparing such position to an extrusion set point;
   (f) generating an extrusion feedback error signal which is corrective of any difference between said position and said set point;
   (g) locating at least one non-contact sensor located proximate said tube in a position above said frost line for sensing the position of said tube prior to the collapsing and flattening of said tube by said collapsing and roller assembly;
   (h) comparing said position to a lay-flat set point;
   (i) generating a lay-flat feedback error signal which is corrective of any difference between said position and said lay-flat set point;
   (j) providing programmable controller for executing program instructions;
   (k) including in said programmable instructions a negative feedback control system which receives said extrusion feedback error signal and said lay-flat feedback error signal as negative feedback injection signals and which provides a control signal to said valve.

16. A method according to claim 15, further comprising: locating said at least one acoustic sensor and said at least one non-contact sensor in different circumferential positions relative to said tube.

17. A method according to claim 15, wherein said lay-flat feedback error signal is provided in the same units as said extrusion feedback error signal.

18. A method according to claim 15, wherein said extrusion feedback error signal defines a primary control feedback control loop, and wherein said lay-flat feedback error signal defines a supplemental feedback control loop.

19. A method according to claim 15, wherein said lay-flat feedback error signal is injected directly into said extrusion feedback control loop.

20. A method according to claim 15, wherein said lay-flat feedback error signal is analyzed prior to injection to determine if it is within a range of acceptable positions.

21. A method according to claim 15, wherein said lay-flat feedback error signal is analyzed prior to injection to determine if it is within an acceptable range of signal rates of change.

* * * * *